United States Patent [19]

Inagaki et al.

[11] Patent Number: 5,544,004

[45] Date of Patent: Aug. 6, 1996

[54] PIN-BOARD MATRIX SWITCH

[75] Inventors: Shuichiro Inagaki, Tokyo; Tadashi Hirono; Shigefumi Hosokawa, both of Saitama, all of Japan

[73] Assignee: Nippon Telegraph and Telephone Corporation, Tokyo, Japan

[21] Appl. No.: 321,129

[22] Filed: Oct. 11, 1994

[30] Foreign Application Priority Data

Oct. 14, 1993 [JP] Japan ................................. 5-280274
Oct. 5, 1994 [JP] Japan ................................. 6-241264

[51] Int. Cl.$^6$ ......................... H02B 1/056; H01H 63/00; H01H 9/00
[52] U.S. Cl. ........................... 361/633; 200/175; 439/43; 439/45; 439/48
[58] Field of Search ..................... 200/1 R, 5 R, 200/175–180; 174/250–264; 439/43–54; 361/633–636

[56] References Cited

U.S. PATENT DOCUMENTS

| 3,151,923 | 10/1964 | Bell et al. | 439/48 |
|---|---|---|---|
| 3,225,322 | 12/1965 | Reel | 439/47 |
| 3,252,056 | 5/1966 | Poesl | 361/633 |
| 4,618,755 | 10/1986 | Wallace | 200/175 |
| 5,017,145 | 5/1991 | Kanai et al. | 439/45 |

FOREIGN PATENT DOCUMENTS

| 0038256 | 10/1981 | European Pat. Off. | H02B 1/20 |
|---|---|---|---|
| 0339653 | 11/1989 | European Pat. Off. | H02B 1/20 |
| 1-276524 | 11/1989 | Japan | H01H 29/06 |

OTHER PUBLICATIONS

"Electromagnetic Wave Propagation Along a Pair of Rectangular Bonded Wire Meshes" by David A. Hill, IEEE Transactions on Electromagnetic Compatibility, vol. EMC–21, No. 2, May 1979, pp. 114–364.

"Design of High Density Pin Board Matrix Switches for Automated Main Distributing Frame Systems" by Shigeru Umemura et al., IEEE Transactions of Components, Hybrids, and Manufacturing Technology, vol. 15, No. 2, Apr. 1992, pp. 266–277.

"High Density Pin Board Matrix Switches for Automated MDF Systems" by Tsueno Kanai et al., IEEE Transactions on Components, Hybrids, and Manufacturing Technology, vol. 15, No. 5, Oct. 1992, pp. 893–903.

"Prediction of Crosstalk Involving Twisted Pairs of Wires–Part II: A Simplified Low–Frequency Prediction Model" by Clayton R. Paul and Jack W. Mcknight, IEEE Transaction On Electromagnetic Compatability, vol. EMC–21, No. 2, May 1979, pp. 105–113.

Primary Examiner—J. R. Scott
Attorney, Agent, or Firm—Blakely, Sokoloff, Taylor & Zafman

[57] ABSTRACT

In a pin-board matrix switch X- and Y-direction patterns are arranged in the X and Y directions to constitute a matrix. Crosspoint holes are formed at the crosspoints between the X- and Y-direction patterns. Each crosspoint hole has contacts formed therein. The contacts are connected to the patterns. A connecting pin has contact springs. The connecting pin is selectively inserted into the crosspoint holes to electrically connecting the contacts of the X-direction patterns and the Y-direction patterns which are adjacent to each other in the Z direction. Insulating members are arranged between the X- and Y-direction patterns. At least one pair of the X-direction patterns and the Y-direction patterns is constituted by first and second wiring layers arranged in the Z direction via insulating members. The two wiring patterns include cut portions, formed at corresponding positions, for dividing each of the first and second wiring patterns into two divided wiring portions, and conductor portions for connecting one divided wiring portion of the first wiring layer to the divided wiring portion of the second wiring layer which faces the divided wiring portion of the first wiring layer along the wiring direction and the other divided wiring portion of the first wiring layer to the remaining divided wiring portion of the second wiring layer.

13 Claims, 32 Drawing Sheets

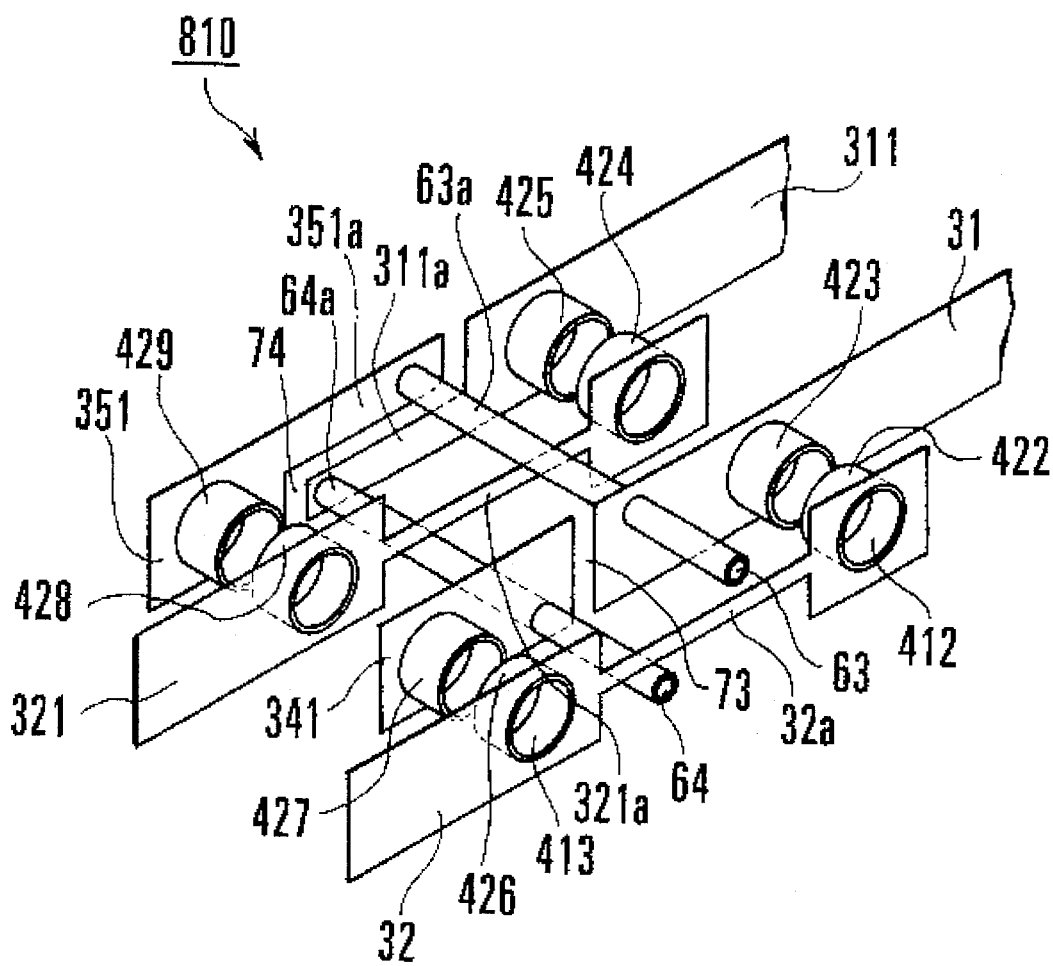
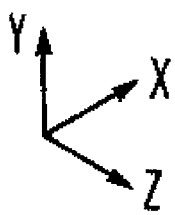
FIG. 10

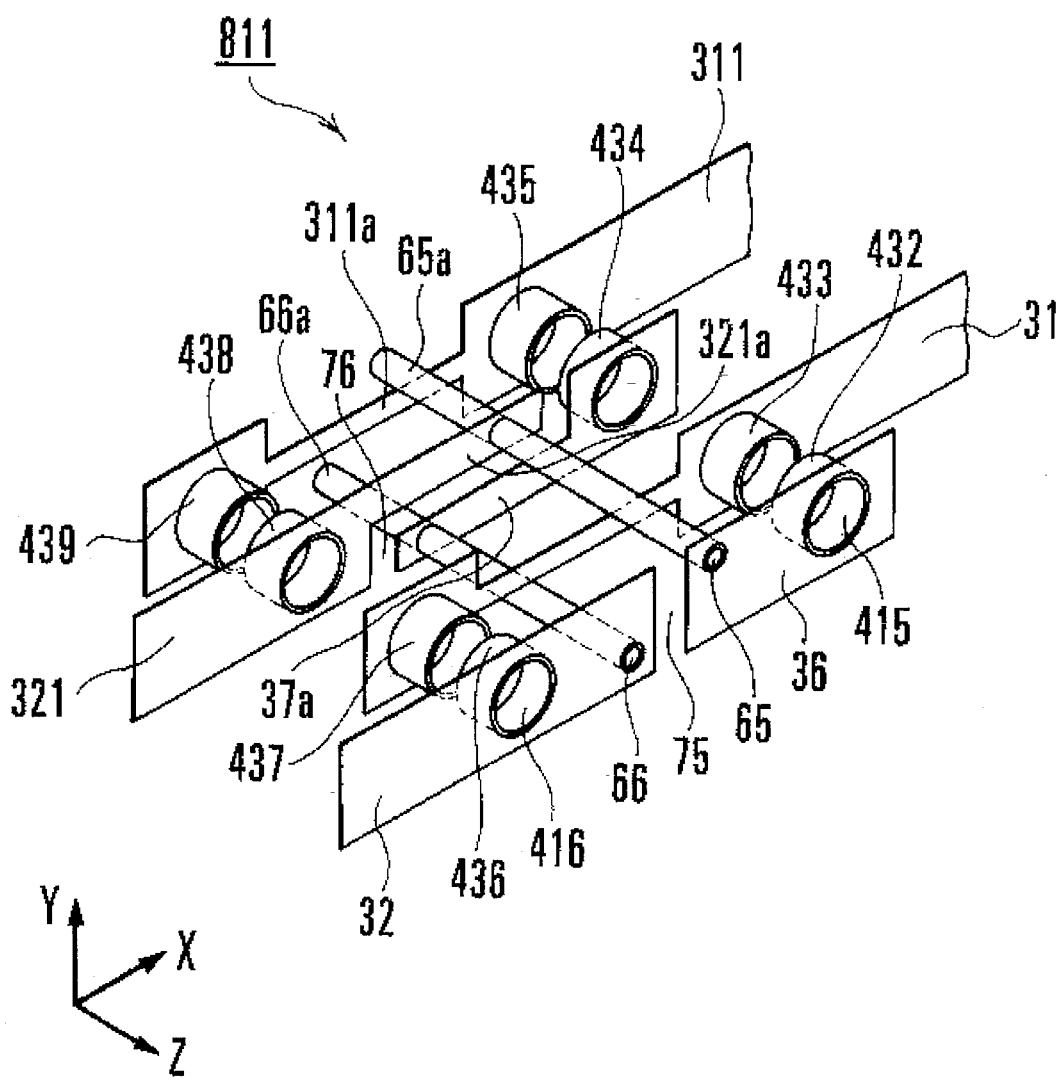
F I G. 12

PIN-BOARD MATRIX SWITCH

BACKGROUND OF THE INVENTION

The present invention relates to a pin-board matrix switch used for a main distribution frame or the like for a communication network in house wiring or the like.

With the recent advances in intelligent buildings, various electric wires are jumbled in the buildings. Of these wires, wires constituting house wiring installed on a floor are classified into wires for a telephone system and wires for a LAN system. In many cases, coaxial cables have been used for the wires for a LAN system. There is a tendency to install twisted pairs of wires so as to facilitate a wiring work or facilitate management of wiring by unifying wires for a telephone system and a LAN system. Congestion of floor wiring, i.e., disorderly installation of various kinds of cables, is one of the problems posed in a recent intelligent building. In order to solve this problem, a preliminary wiring work is performed by using twisted pairs of wires for floor wiring use under predetermined wiring management. Afterward, actual wiring work is performed in a patch panel on demand.

This patch panel wiring, however, is performed manually. Although systems for automatically performing wiring management have already been developed and commercially available, a patch panel itself is manually installed. For this reason, an actual work result may disagree with wiring management data. In addition, cumbersome wiring operations must be manually performed in a patch panel wiring work, and it is difficult to change wiring.

Under the circumstances, a pin-board matrix switch is used. With this switch, wiring can be easily changed by inserting/removing a connecting pin, and an automatic wiring work can be easily realized. This pin-board matrix switch can be manufactured by general printed board techniques and hence can be realized at a low cost. At the same time, a high-density switch can be realized. Therefore, the pin-board matrix switch is suitable for a reduction in size.

On the other hand, a conventional pin-board matrix switch is only capable of allowing from telephone lines and up to 320-kbps time compression multiplexing transmission lines for ISDN basic interface (i.e., only capable of providing services via metal wires), but cannot keep up with the speed of a high-speed LAN demanded in the future.

A conventional pin-board matrix switch like the one shown in FIG. 32 is disclosed in Japanese Patent Laid-Open No. 1-276524. This switch will be described below with reference to FIG. 32. A pin-board matrix switch denoted by reference numeral 5 as a whole is constituted by a matrix board 9 and a connecting pin 51. The matrix board 9 is formed by alternately stacking insulating substrates 11, 12, 13, and 14, each having an electroless plating catalyst dispersed therein, and insulating substrates 16, 17, and 18, each containing no electroless plating catalyst. Reference numerals 21 and 22 denote Y-direction patterns formed on the first layer; 211 and 221, Y-direction patterns formed on the third layer; 31, an X-direction pattern formed on the second layer; and 311, an X-direction pattern formed on the fourth layer. A signal line is constituted by the Y-direction patterns 21 and 211 and the X-direction patterns 31 and 311, which oppose each other in the Z direction.

Reference numeral 41 denotes a crosspoint hole formed at the crosspoint between X- and Y-direction patterns and incorporating a contact 42 electrically connected to the Y-direction pattern 21 on the first layer and a contact 43 electrically connected to the X-direction pattern 31 on the second layer; and 51, a connecting pin having a pair of contact springs 53 and 54 arranged on an insulating shaft 52. When the connecting pin 51 is inserted into the crosspoint hole 41, contacts 42 and 43 and contacts 44 and 45 (not shown) are electrically connected to each other via the contact springs 53 and 54. As a result, the Y-direction pattern 21 on the first layer and the X-direction pattern 31 on the second layer are electrically connected to each other, so are the Y-direction pattern 211 on the third layer and the X-direction pattern 311 on the fourth layer.

In the above conventional pin-board matrix switch, since a plurality of patterns are arranged at small intervals, large crosstalk is induced from an adjacent pattern pair. For this reason, a high-speed signal line cannot be accommodated.

In the conventional pin-board matrix switch 5, when, the connecting pin 51 is inserted into the crosspoint hole 41 to set a route having a short signal transmission distance, a pattern (to be referred to as an open line) extending from the crosspoint hole 41 to a crosspoint hole 42 in an end portion of the matrix board is added, in an open state, to the signal transmission route. For this reason, as the signal speed increases, and the wavelength of a signal approaches the size of the matrix board 9, variations in characteristic impedance due to a stray capacitance become conspicuous, resulting in a considerable deterioration in the transmission characteristics of the pin-board matrix switch 5. Furthermore, as the signal speed increases, crosstalk in an open line cannot be neglected, resulting in a deterioration in the transmission characteristics of the pin-board matrix switch. For this reason, the conventional pin-board matrix switch 5 cannot accommodate a high-speed signal line.

SUMMARY OF THE INVENTION

It is, therefore, a principal object of the present invention to provide a pin-board matrix switch which can reduce crosstalk induced from an adjacent pattern pair and accommodate a high-speed signal line.

It is another object of the present invention to provide a pin-board matrix switch which can accommodate a high-speed signal line by reducing variations in characteristic impedance caused by an open line and crosstalk caused in the open line.

It is still another object of the present invention to provide a method of manufacturing a highly reliable pin-board matrix switch by uniformly plating contacts in crosspoint holes.

In order to achieve the above objects, according to the present invention, there is provided a pin-board matrix switch comprising a plurality of X-direction patterns arranged in an X direction, Y-direction patterns arranged in a Y direction to constitute a matrix together with the X-direction patterns, crosspoint holes formed at crosspoints between the X- and Y-direction patterns, each of the crosspoint holes having contacts formed therein, and the contacts being connected to the patterns, a connecting pin having contact springs, the connecting pin being selectively inserted into the crosspoint holes to electrically connecting contacts of the X-direction patterns and the Y-direction patterns which are adjacent to each other in a Z direction, and insulating members arranged between the X- and Y-direction patterns, wherein at least one pair of the X-direction patterns and the Y-direction patterns is constituted by first and second wiring layers arranged in the Z direction via the insulating member, and the two wiring patterns include cut portions, formed at corresponding positions, for dividing each of the first and second wiring patterns formed on the first and second wiring layers into two divided wiring portions, and conductor portion for connecting one divided wiring portion of the first wiring layer to the divided wiring portion of the second layer which faces the wiring portion of the first layer along a longitudinal direction and the other divided wiring portion of the first wiring layer to the remaining divided wiring portion of the second layer.

BRIEF DESCRIPTION OF THE DRAWINGS

FIG. 10 is a perspective view showing the main portion of the embodiment shown in FIG. 9;

FIG. 12 is a perspective view showing a pin-board type polarity reversing circuit used in a pin-board matrix switch according to still another embodiment of the present invention;

DESCRIPTION OF THE PREFERRED EMBODIMENTS

Pin-board matrix switches according to the embodiments of the present invention will be described below with reference to the accompanying drawings.

Figure 1:
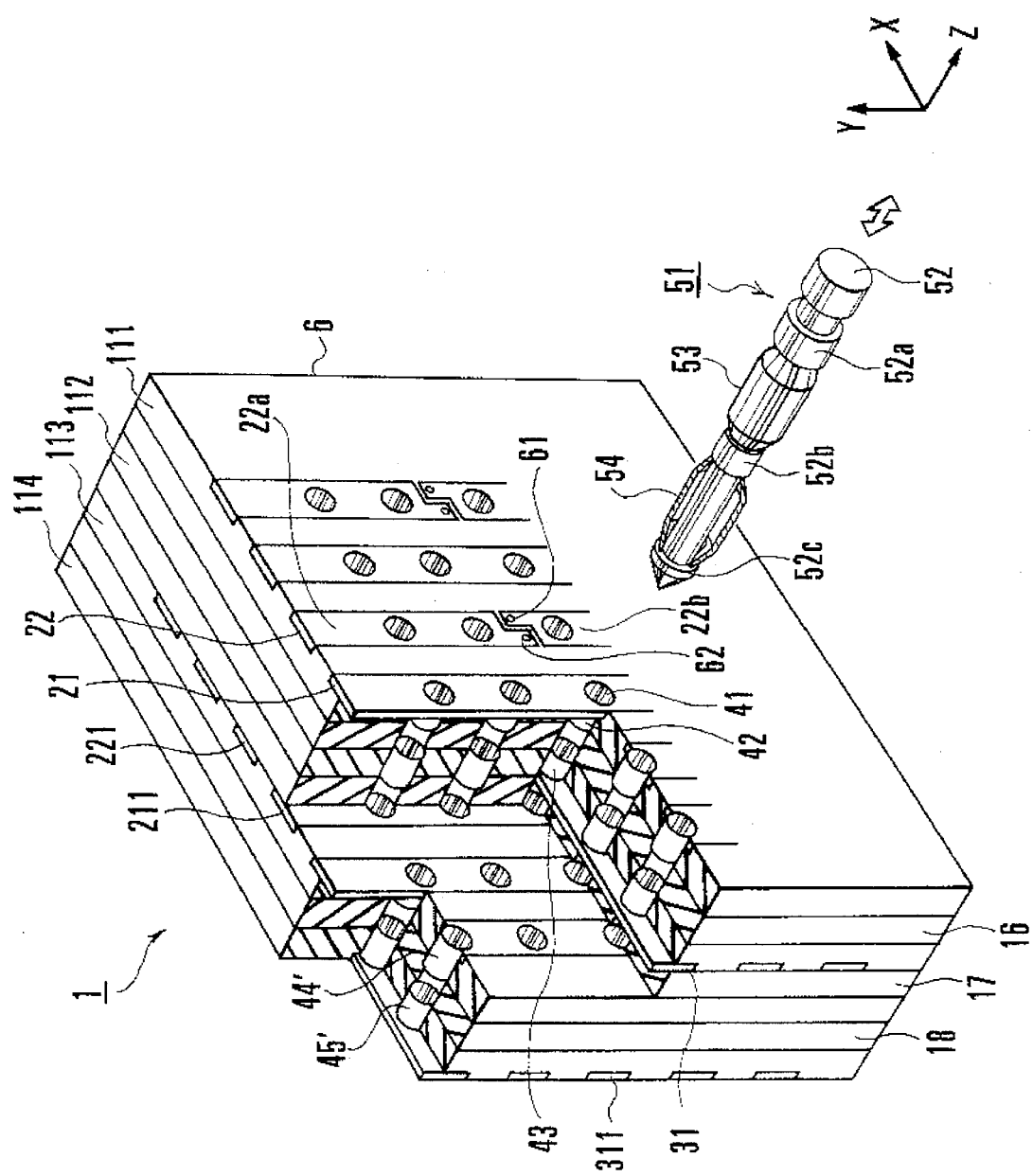
FIG. 1 is a partially cutaway perspective view of a pin-board matrix switch according to the present invention.
Figure 2:
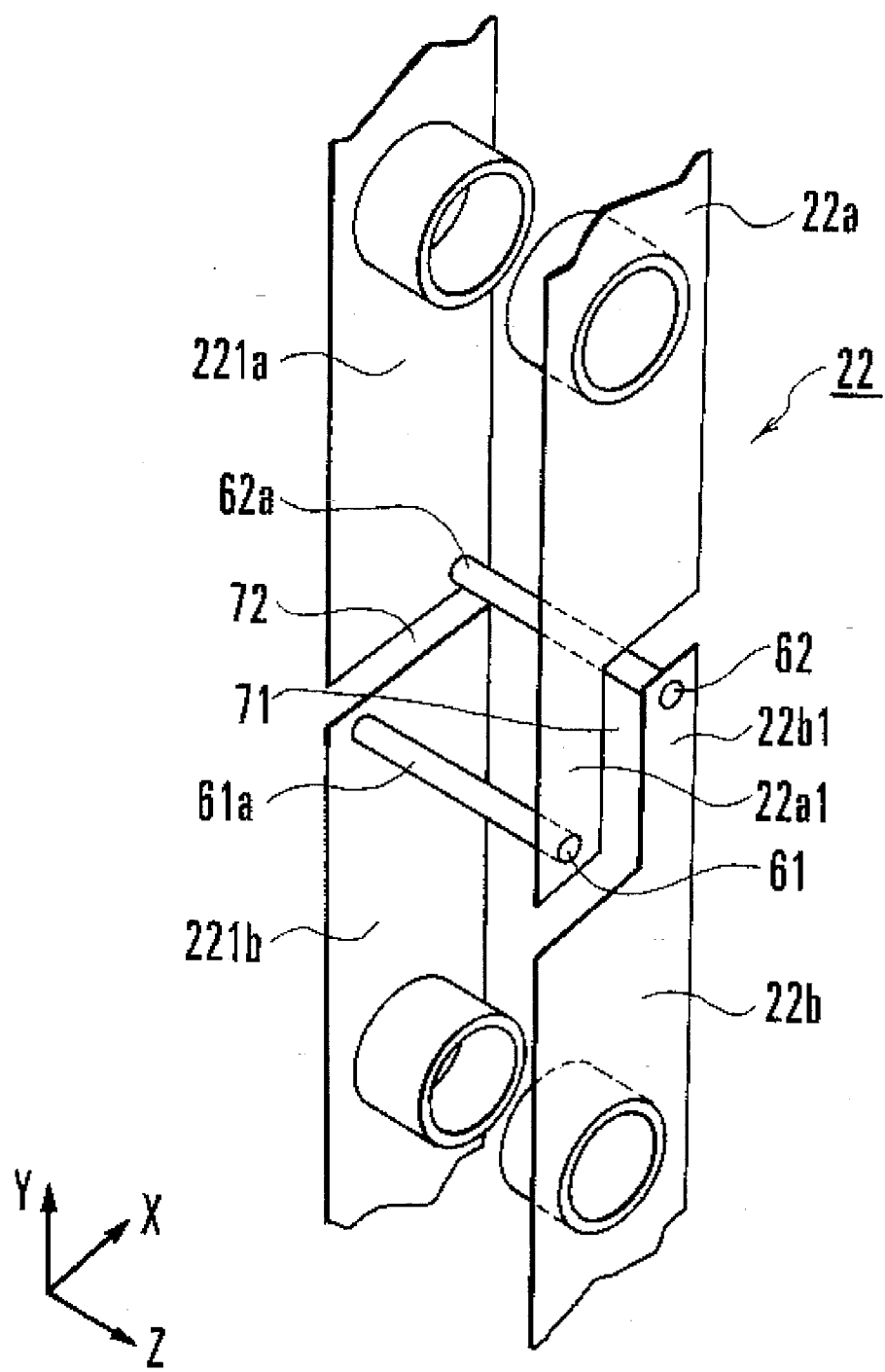
FIG. 2 is a perspective view showing the main portion of the pin-board matrix switch according to the present invention.

FIG. 1 shows a pin-board matrix switch according to the present invention. FIG. 2 shows how patterns and via holes are arranged, without showing insulating substrates, in the pin-board matrix switch. The same reference numerals in FIGS. 1 and 2 denote the same parts as in the prior art described above.

A pin-board matrix switch denoted by reference numeral 1 as a whole is constituted by a matrix board 6 and a connecting pin 51. Two or more connecting pins may be used as needed. The matrix board 6 is formed by alternately stacking insulating substrates 11, 12, 13, and 14, on which patterns are formed, and insulating substrates 16, 17, and 18, on which no wiring patterns are formed. Reference numerals 21 and 22 denote Y-direction patterns on the first layer formed on the insulating substrate 11 to be parallel in the Y direction; 211 and 221, Y-direction patterns on the third layer formed on the insulating substrate 13; 31, one of X-direction patterns on the second layer formed on the insulating substrate 12 to be parallel in the X direction; and 311, one of X-direction patterns on the fourth layer formed on the insulating substrate 14 to be parallel in the X direction. The Y-direction patterns 21 and 211 are arranged to oppose each other in the Z direction so as to form a pair constituting a required signal line, so are the X-direction patterns 31 and 311.

Electroless plating catalyst dispersed insulating substrates are used as the insulating substrates 11, 12, 13 and 14, and insulating substrates containing no electroless plating catalyst are used as the insulating substrates 16, 17, and 18. In this electroless plating process, glass epoxy is often used. However, the material used in the process is not limited to glass epoxy.

Reference numeral 41 denotes a crosspoint hole (through hole) formed in a crosspoint between an X-direction pattern and a Y-direction pattern. The crosspoint hole 41 incorporates a contact 42 electrically connected to the Y-direction pattern 21 of the first layer, and a contact 43 electrically connected to the X-direction pattern 31 of the second layer. The contacts 42 and 43 are respectively formed along the internal surfaces of the crosspoint hole 41 bored in the insulating substrates 11 and 13 by using, e.g., a known plating technique. Note that the respective contacts are physically and electrically separated from each other unless they are connected via a connecting pin (to be described later).

Reference numeral 51 denotes the above connecting pin having a pair of contact springs 53 and 54 arranged on an insulating shaft 52. These contact springs 53 and 54 are constituted by leaf springs, each having pawls formed on its upper and lower portions. These pawls are held on spring mount portions 52a, 52b, and 52c, arranged on the insulating shaft 52 at predetermined intervals, so as to be mounted and fixed on the insulating shaft 52, as shown in FIG. 1. This structure is known and shown in, e.g., FIGS. 18 and 19 in Japanese Patent Application No. 63-283201 (Japanese Patent Laid-Open No. 1-276524 published on Nov. 7, 1989) filed on Nov. 9, 1988 by the present inventors. As is apparent, this contact spring structure is not limited to this embodiment but may be replaced with a known structure having a spring function.

When the connecting pin 51 is inserted into a predetermined crosspoint hole 41, the contacts 42 and 43 and the contacts 44 and 45 (not shown; shown as contacts 44' and 45' in FIG. 1) are electrically connected to each other via the contacts 53 and 54. As a result, the Y-direction pattern 21 of the first layer and the X-direction pattern 31 of the second layer are electrically connected to each other, so are the Y-direction pattern 211 of the third layer and the X-direction pattern 311 of the fourth layer.

In this arrangement, now referring to FIG. 2 this embodiment is characterized in that cut portions 71 and 72 are respectively formed at the midpoints of a pair of patterns constituting a signal line, i.e., the Y-direction patterns 22 and 221 of the first and third layers which oppose each other in the Z direction, so as to cut the patterns in substantially the X direction, thereby dividing the patterns into patterns 22a and 22b, and patterns 221a and 221b, respectively, as clearly shown in FIG. 2. The structure of this cut portion will be described in more detail below. The patterns 221a and 221b are cut along a direction perpendicular to the wiring direction, i.e., the Y direction. In addition, a gap, i.e., the cut portion 72, is ensured between the patterns 221a and 221b such that ends of the two patterns are spaced apart from each other by a certain distance. In contrast to this, portions 22a1 and 22b1 protrude from ends of the patterns 22a and 22b. Each protruding portion has a width almost equal to ½ the width of each pattern. A crank-like gap, i.e., the cut portion 71, is ensured between the protruding portions to space them apart from each other. As a result, the protruding potion 22a1 of the pattern 22a is located above the pattern 221b, and the protruding portion 22b1 of the pattern 22b is located above the pattern 221a.

Furthermore, small-diameter via holes 61 and 62 are formed in the distal ends of the protruding portions 22a1 and 22b1 of the patterns 22a and 22b. The via holes 61 and 62 are respectively connected to conductors 61a and 62a which extend through the insulating substrates 11, 16, 12, and 17 sandwiched between the patterns to perform interconnection. The patterns 22a and 221b, and the patterns 22b and 221a are electrically connected to each other via the via holes 61 and 62 and the conductors 61a and 62a, thereby providing the Y-direction patterns 22a, 22b, 221a, and 221b of the matrix board 6 with a twist structure. In other words, with this connecting structure, upper and lower wiring portions are cross-connected to each other.

With the provision of such a twist structure, crosstalk induced from the Y-direction patterns 22a and 221a to the Y-direction patterns 21 and 211 cancels out crosstalk induced from the Y-direction patterns 22b and 221b to the Y-direction patterns 21 and 211. Therefore, the transmission characteristics of the pin-board matrix switch can be greatly improved. In addition, this twist structure can be integrally formed in the working process for a printed circuit board at the same time when a matrix board is formed. That is, the twist structure is very economical.

Figure 3:
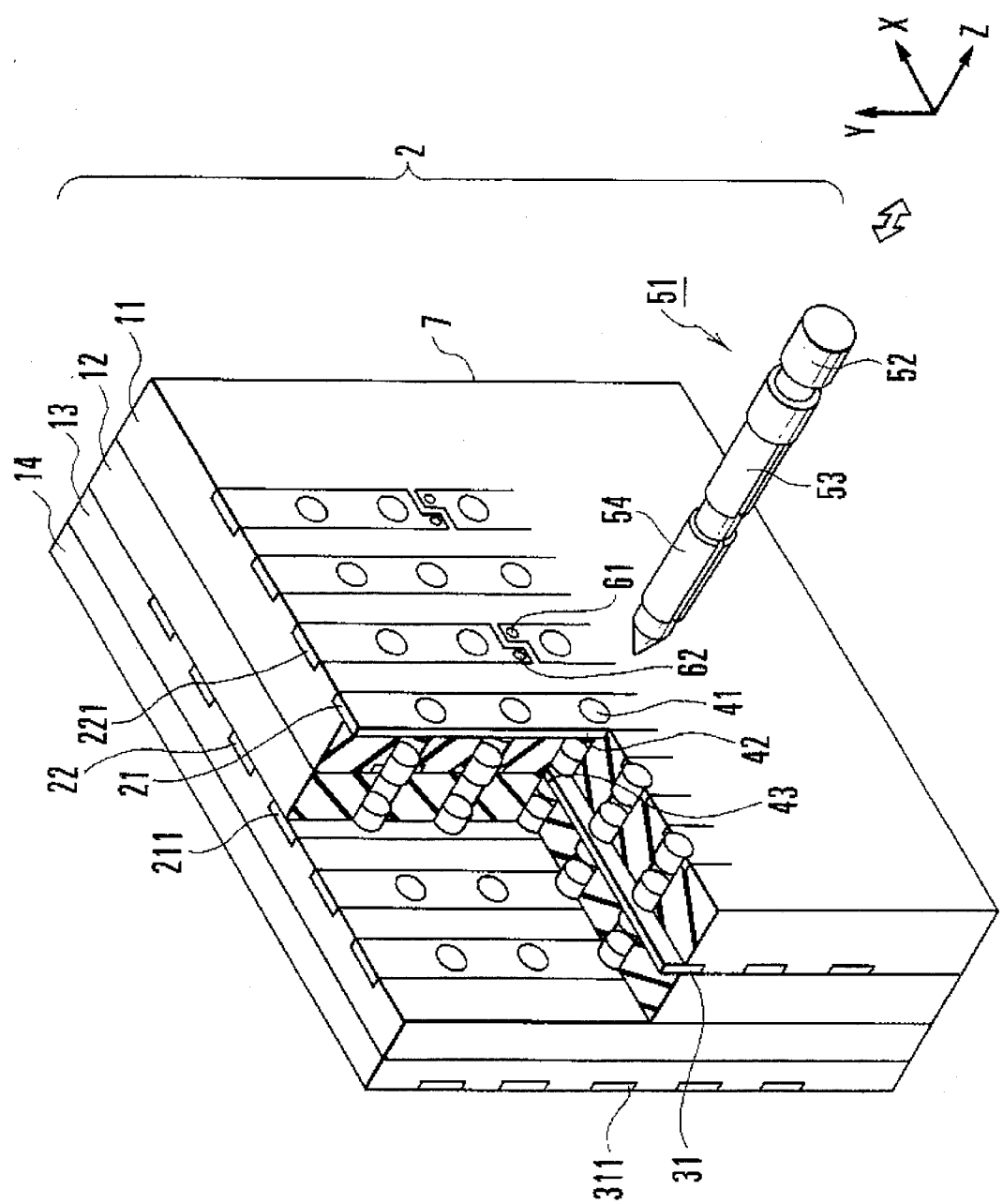
FIG. 3 is a partially cutaway perspective view of another embodiment of the present invention.

In the embodiment shown in FIGS. 1 and 2, the insulating substrates 11, 12, 13, and 14 are electroless plating catalyst dispersed and expensive. As shown in FIG. 3, however, the same function as that of the embodiment described above can be realized by even a matrix board 7 of which the insulating substrates 111, 112, 113, and 114 do not contain electroless plating catalyst, and hence is more economical than the above embodiment accordingly. As is apparent, in this arrangement, contacts are formed on the radial edge of the patterns 21, 211, 31, and 311 of the crosspoint hole 41 to be to be physically and electrically separated from each other unless they are connected via the connecting pin 51. As a material used for each of the insulating substrates 111, 112, 113, and 114, a material such as glass epoxy, polyimide, Teflon, or a ceramic material is used.

If a twist structure is provided for the X-direction patterns as well as the Y-direction patterns, since crosstalk caused in the X-direction patterns can also be canceled out, a further reduction in crosstalk can be achieved. If one or a plurality of twist structures are provided for every pattern, external noise induced in all the patterns can be canceled out in the same manner as that of canceling out crosstalk in the matrix board. Therefore, the noise immunity with respect to an environmental electromagnetic field can be improved.

Figure 4:
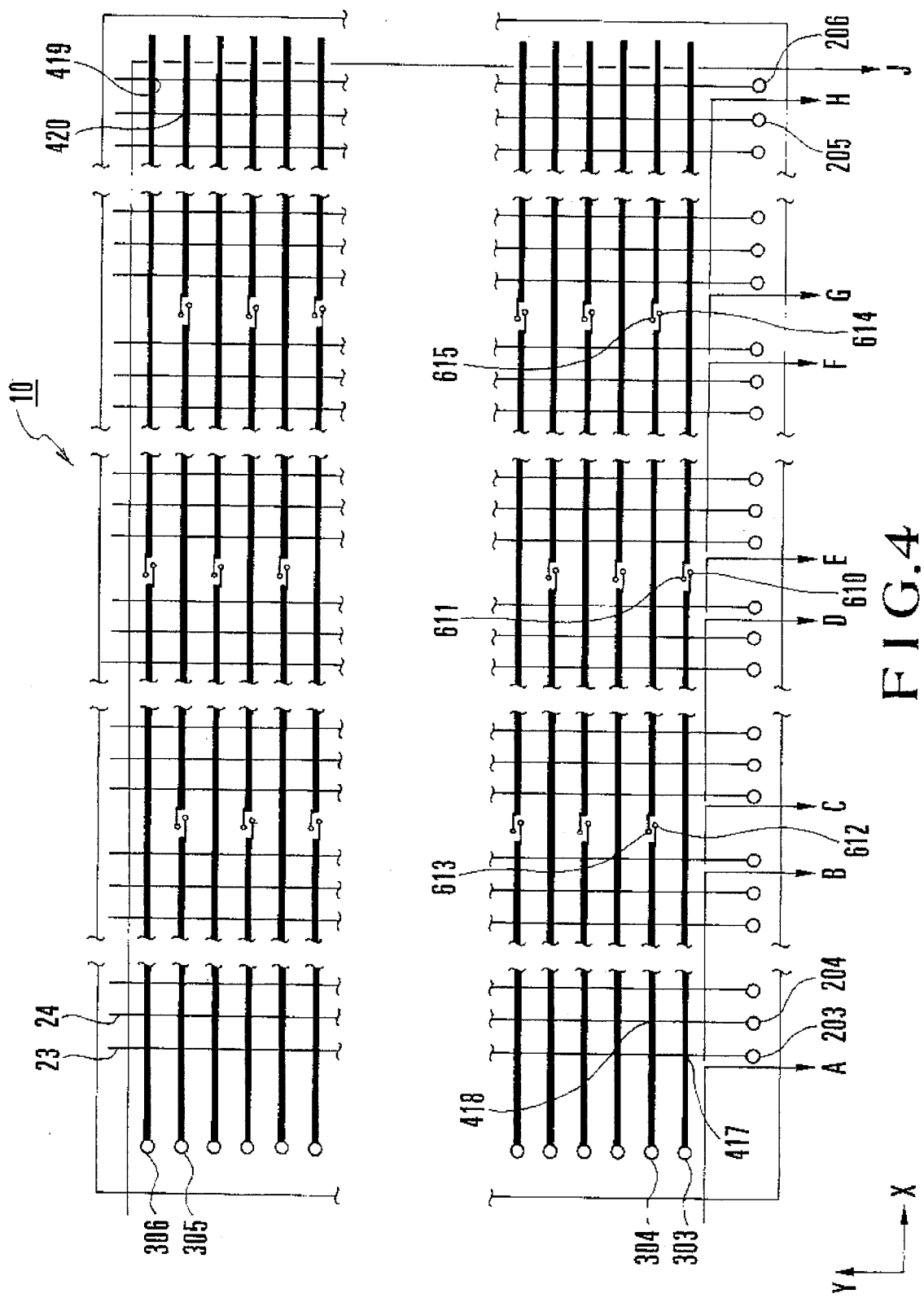
FIG. 4 is a view showing set routes for evaluating crosstalk reducing effects in the pin-board matrix switch according to the present invention.
Figure 5:
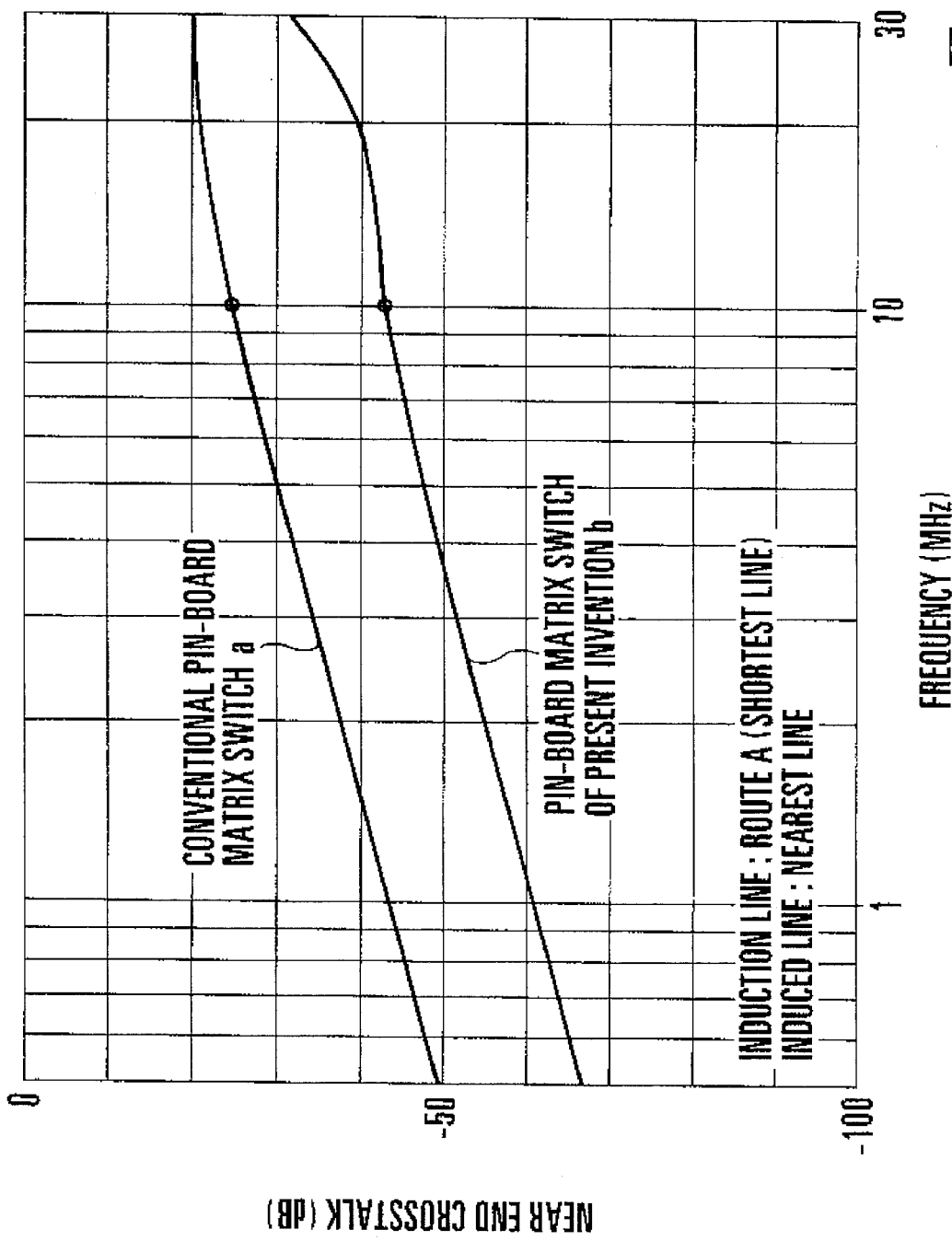
FIG. 5 is a graph showing near end crosstalk induced from the shortest route to the nearest adjacent route in the pin-board matrix switch according to the present invention in comparison with a conventional pin-board matrix switch.
Figure 6:
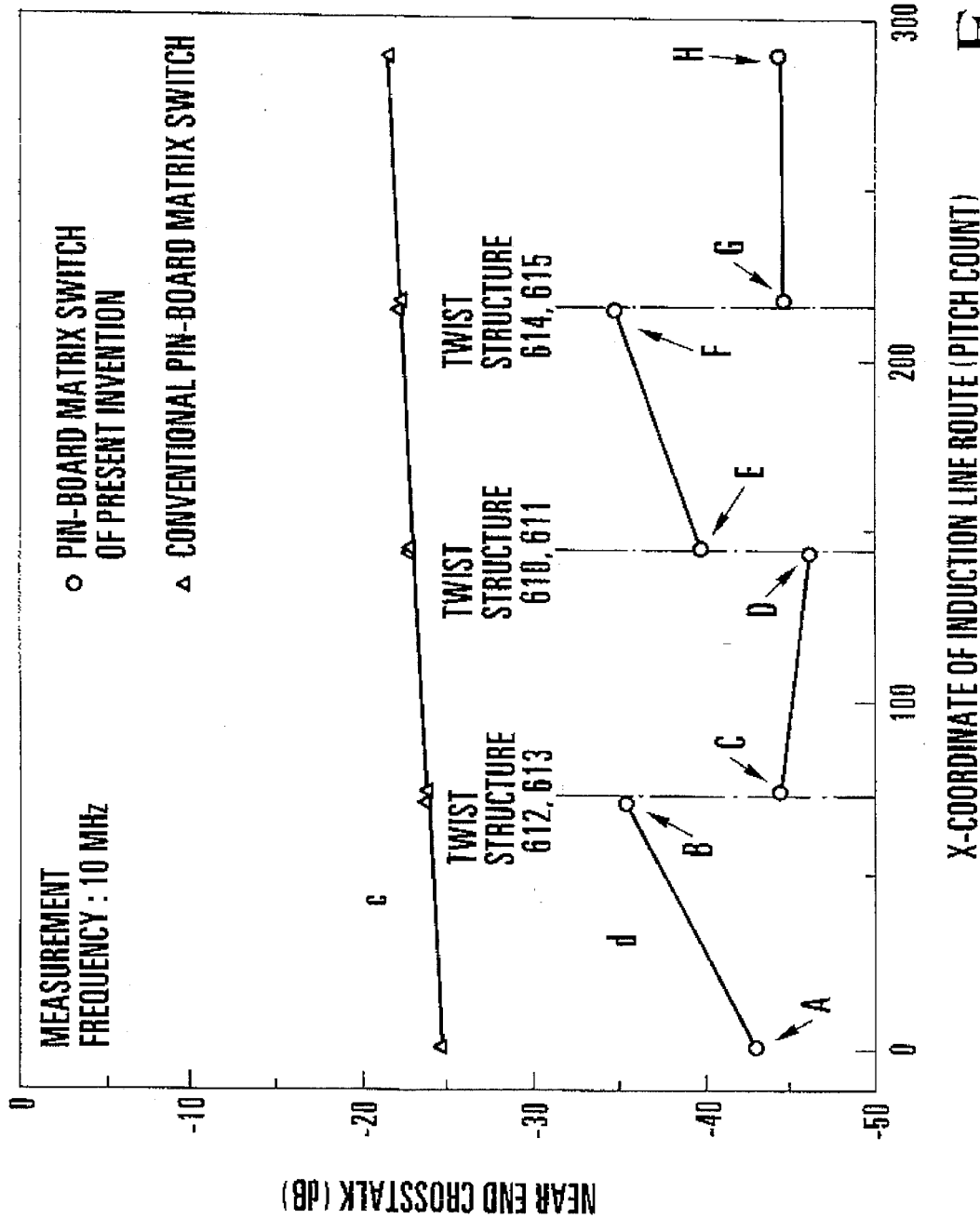
FIG. 6 is a graph showing results obtained by measuring near end crosstalk in the pin-board matrix switch according to the present invention while changing the route, in comparison with the conventional pin-board matrix switch.

FIG. 4 shows set routes in a pin-board matrix switch for an evaluation test for evaluating crosstalk reducing effects obtained by a twist structure. In this pin-board matrix switch 10, X-direction patterns 303 and 304 are alternately arranged. Each X-direction pattern 303 has a twist structure, constituted by via holes 610 and 611, in the middle of the pattern. Each X-direction pattern 304 has a twist structure constituted by via holes 612 and 613, and a twist structure constituted by via holes 614 and 615. Each twist structure is formed at a portion, of the X-direction pattern 304, which is separated from its end portion by a distance corresponding to approximately ¼ the total length of the pattern. Although not shown in FIG. 4, similar twist structures are formed in the Y-direction patterns. That is, twist structures are arranged at three portions in the X and Y directions, respectively. The pitch of patterns and the width of each pattern are 1.5 mm and 1.2 mm, respectively. The matrix size is 280 mm×180 mm. In this pin-board matrix switch 10, the route of an induction line was changed from a route A to a route H, and near end crosstalk induced from the induction line to the nearest line spaced apart from the induction line by one pitch in the X and Y direction was evaluated. FIGS. 5 and 6 show evaluation results.

FIG. 5 shows an example of measurement of near end crosstalk induced from a route A, i.e., the shortest route connecting an input/output terminal 303, a crosspoint 417, and an input/output terminal 203, to the nearest route connecting an input/output terminal 304, a crosspoint 418, and an input/output terminal 204. FIG. 5 also shows measurement of near end crosstalk in a conventional pin-board matrix switch for comparison. According to a conventional theory (e.g., R. Paul et al, "Prediction of Crosstalk Involving Twisted Pairs of Wires-Part II: A Simplified Low-Frequency Prediction Model", IEEE TRANSACTIONS ON ELECTROMAGNETIC COMPATIBILITY, VOL. EMC-2, NO. 2, MAY 1979), a twist structure is effective only for electromagnetic coupling but is not effective for electrostatic coupling, that is, a twist structure exhibits no noise reducing effect unless it is in a route in which a signal current flows. Contrary to this conventional theory, it is apparent that the near end crosstalk in the route A having no twist structure arranged therein and its nearest route can be reduced by 15 dB or more throughout the measurement frequency band. The reason for this effect seems to be that the twist structures cancel out noise caused by electrostatic coupling in lines extending from the crosspoints 417 and 418.

FIG. 6 shows measurement of near end crosstalk in the nearest route to each of different induction lines for 10 MHz. In FIG. 6, the pin-board matrix switch 10 of the present invention is compared with the conventional pin-board matrix switch. Referring to FIG. 6, characteristics c indicated by marks Δ are obtained by the conventional pin-board matrix switch having no twist structure, and characteristics j indicated by marks o are obtained by the pin-board matrix switch of the present invention. As is apparent from these characteristics, according to the present invention, even in a route B as a signal transmitting route having no twist structure therein, the near end crosstalk can be reduced by 10 dB or more as in the route A. In addition, in the routes C to H as signal transmitting routes having twist structures therein, the near end crosstalk reducing effects based on the twist structures are remarkable. Furthermore, it was also confirmed that the near end crosstalk induced from a route J, i.e., the longest route connecting an input/output terminal 206, the crosspoint 419, and an input/output terminal 306, to the nearest route connecting an input/output terminal 205, a crosspoint 420, and an input/output terminal 305 was −41 dB for 10 MHz, which was smaller than the near end crosstalk in the conventional pin-board matrix switch by 20 dB. It is apparent from the above description that in the pin-board matrix switch having twist structures according to the present invention, crosstalk noise in every possible route can be greatly reduced.

Figure 7:
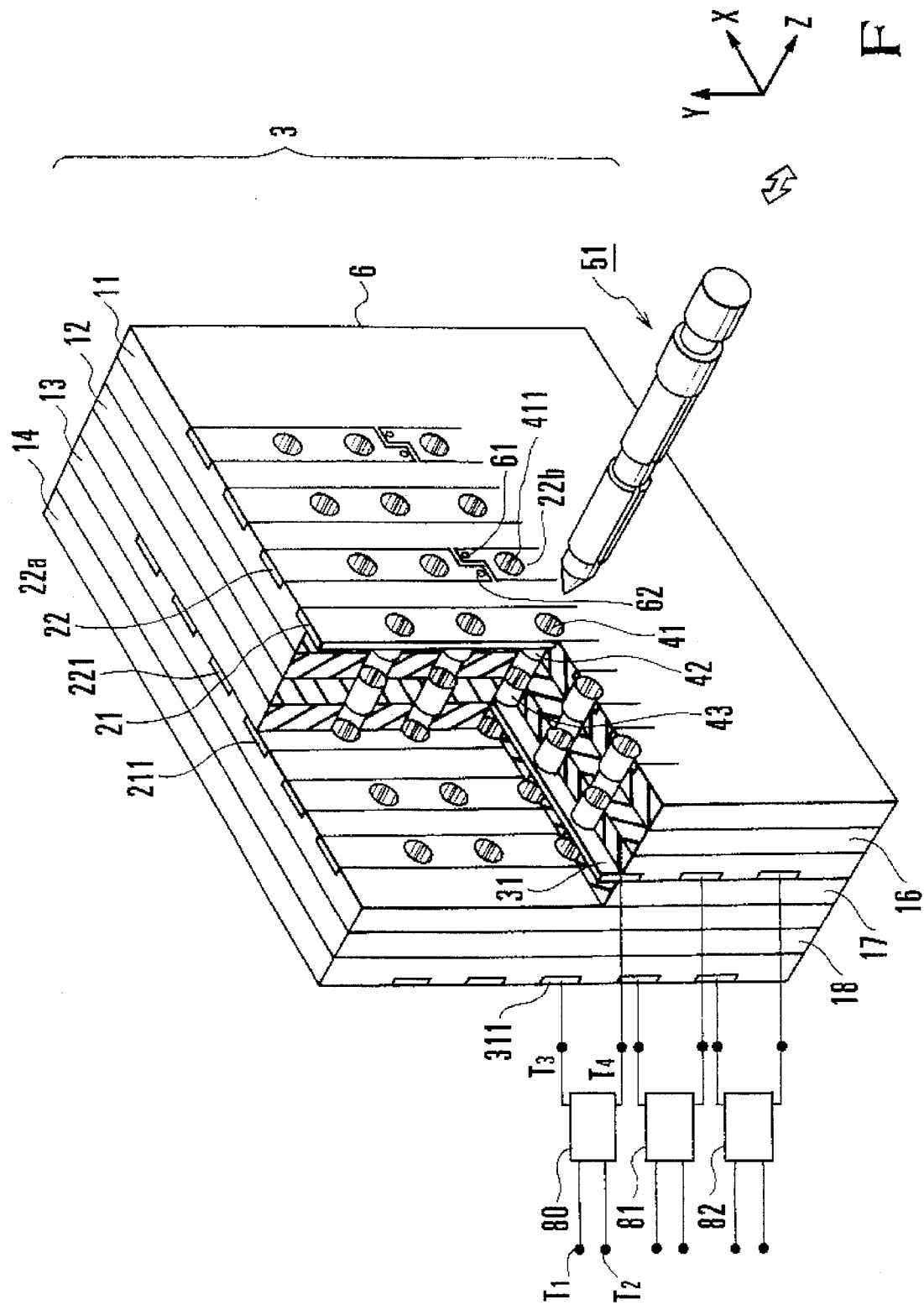
FIG. 7 is a partially cutaway perspective view of still another embodiment of the present invention.
Figure 8:
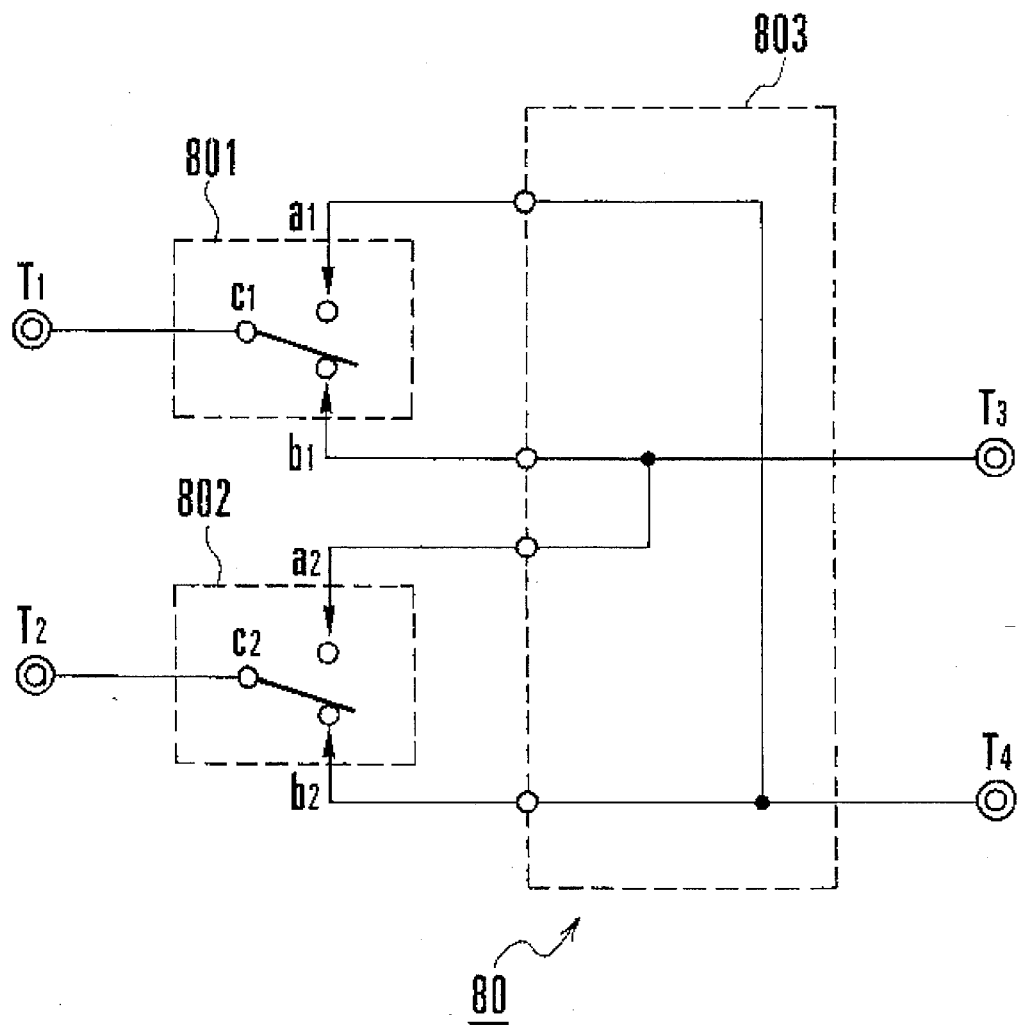
FIG. 8 is a circuit diagram of a polarity reversing circuit used in the embodiment shown in FIG. 7.

FIG. 7 shows another embodiment of the present invention. This embodiment is different from the embodiment shown in FIG. 1 in that polarity reversing circuits 80, 81, and 82 are added, as external circuits, to a pin-board matrix switch. FIG. 8 shows the circuit arrangement of the polarity reversing circuit 80 in FIG. 7 as a representative. Referring to FIG. 8, the polarity reversing circuit 80 is a relay type polarity reversing circuit. Reference numerals 801 and 802 denote transfer relays. The relay 801 has a moving contact c1 and stationary contacts a1 and b1. The relay 802 has a moving contact c2 and stationary contacts a2 and b2. Reference numeral 803 denotes an external wiring circuit connected to the stationary contact sides of the relays 801 and 802. Reference symbols T1, T2, T3, and T4 denote external connecting terminals. For example, the terminals T1 and T2 are connected to an external circuit, and the terminals T3 and T4 are connected to input or output terminals of the pin-board matrix switch. As is apparent, the terminals T3 and T4 may be connected to an external circuit, and the terminals T1 and T2 may be connected to input or output terminals of the pin-board matrix switch. In addition, the external wiring circuit 803 is arranged between the stationary contacts a1, b1, a2, and b2 of the transfer relays 801 and 802 and the external connecting terminals T3 and T4. The stationary contacts a1 and b2 are connected to the external connecting terminal T4, and the stationary contacts b1 and a2 are connected to the external connecting terminal T3.

In this arrangement, when a connecting pin 51 is inserted into a crosspoint hole 41 of a matrix board 6, a Y-direction pattern 21 is electrically connected to an X-direction pattern 31, and a Y-direction pattern 211 is electrically connected to an X-direction pattern 311. When the connecting pin 51 is inserted into an adjacent crosspoint 411, a Y-direction pattern 22 is connected to an X-direction pattern 311 via a via hole 62, and a Y-direction pattern 221 is connected to an X-direction pattern 31 via a via hole 61. As a result, the polarity of an output from the pin-board matrix switch 3 having the polarity reversing circuits is reversed. For this reason, if an output from the pin-board matrix switch is reversed by the polarity reversing circuit 80 arranged on the extended lines of the X-direction patterns 31 and 311 of the matrix board 6, the polarity of an output from the pin-board matrix switch can always be kept constant. If, for example, the polarity reversing circuit 80 shown in FIG. 8 is used, since the polarity of the polarity reversing circuit 80 can be reversed by simultaneously switching the contacts of the transfer relays 801 and 802, the polarity of an output from the pin-board matrix switch having the polarity reversing circuits can be maintained.

As is apparent, the terminals T1 and T2 of the polarity reversing circuit 80 can be connected to the matrix board 6 side, and the terminals T3 and T4 can be connected to the external circuit side. Instead of a relay type polarity reversing circuit, a polarity reversing circuit constituted by various types of switching elements, e.g., a semiconductor polarity reversing circuit using semiconductor switches, may be used. Furthermore, in this embodiment, as an example of the polarity reversing circuit 80, a relay type polarity reversing circuit designed to be externally mounted is used. However, the present invention is not limited to this. The polarity reversing circuit 80 can be variously changed in design. For example, a pin-board type polarity reversing circuit may be integrally formed with a matrix board on the extended lines of an X-direction or Y-direction pattern pair of the matrix board.

Figure 9:
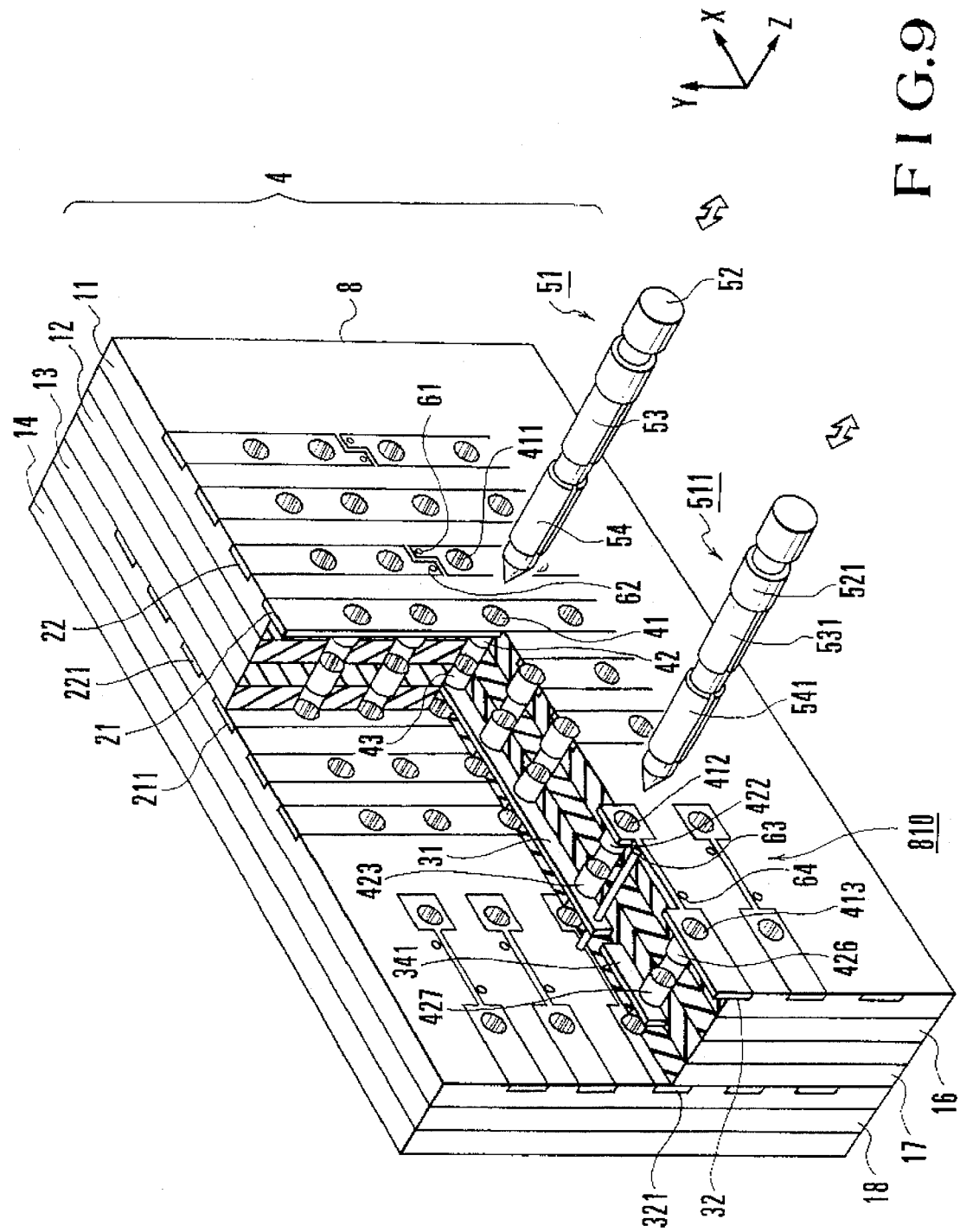
FIG. 9 is a partially cutaway perspective view of still another embodiment of the present invention.

FIG. 9 shows still another embodiment of the present invention, in which polarity reversing circuits are incorporated in a matrix board. FIG. 10 shows the arrangement of patterns, crosspoint holes, and via holes, with insulating substrates of the embodiment shown in FIG. 9 being omitted. This embodiment is characterized in that a pin-board type polarity reversing circuit 810 is arranged on the extended lines of an X-direction pattern pair on a matrix board 8.

Referring to FIGS. 9 and 10, the pin-board type polarity reversing circuit 810 is constituted by a connecting pin 511 and a four-layer pattern as a unit consisting of first and second layer patterns 32 and 341 constituting a first pattern, and third and fourth layer patterns 321 and 351 constituting a second pattern. The patterns 341 and 351 of the second and fourth layers are formed on the extended lines of the X-direction patterns 31 and 311 of the second and fourth layers and are separated therefrom via cut portions 73 and 74 which are perpendicular to the signal transmission direction.

The structure of the cut portions 73 and 74 will be described in more detail below. The patterns 341 and 31 are cut from each other along the direction perpendicular to the wiring direction, i.e., the Y direction, and a gap, i.e., the cut portion 73, is ensured between ends of the two patterns to space them apart from each other by a certain distance. In contrast to this, portions 351a and 311a protrude from ends of the patterns 351 and 311, respectively. The width of each protruding portion is almost ½ the width of each pattern. A crank-like gap, i.e., the cut portion 74, is ensured between the two protruding portions to space them apart from each other. As a result, the protruding portion 351a of the pattern 351 is located below the pattern 31, and the protruding portion 311a of the pattern 311 is located below the pattern 341.

Small-diameter via holes 63 and 64 are formed in the distal ends of the protruding portions 351a and 311a of the patterns 351 and 311. The via holes 63 and 64 are connected to conductors 63a and 64a which extend through insulating substrates 17, 13, 18, and 14 sandwiched between the patterns 31 and 311 to perform interconnection. The patterns 31 and 351, and the patterns 311 and 341 are electrically connected to each other via the via holes 63 and 64 and the conductors 63a and 64a. In this case, in order to prevent the patterns 32 and 321 from overlapping the via holes 63 and 64 and the conductors 63a and 64a, the corresponding portions of the patterns are formed into portions 32a and 321a which are narrower than the remaining portions.

Referring to FIGS. 9 and 10, reference numerals 412 and 413 denote first and second crosspoint holes in the pin-board type polarity reversing circuit; 422, 423, 424, and 425, conductor contacts formed in the first crosspoint hole 412; and 426, 427, 428, and 429, conductor contacts formed in the second crosspoint hole 413.

The pattern 32 of the first layer and the pattern 321 of the third layer constitute an input/output wiring pair. The pattern 32 is electrically connected to the contact 422 in the crosspoint hole 412 and the contact 426 in the crosspoint hole 413, whereas the pattern 321 is electrically connected to the contact 424 in the crosspoint hole 412 and the contact 428 in the crosspoint hole 413. The pattern 31 of the second layer and the pattern 311 of the fourth layer constitute an X-direction pattern pair of the matrix board 8. The pattern 31 is electrically connected to the contact 423 in the crosspoint hole 412, whereas the pattern 311 is electrically connected to the contact 425 in the crosspoint hole 412. The pattern 341 is connected to the pattern 311 via the via hole 64 and the conductor 64a, so that the contact 427 in the crosspoint hole 413 is electrically connected to the contact 425 in the crosspoint hole 412. Similarly, the pattern 351 is connected to the pattern 31 via the via hole 63, so that the contact 429 in the crosspoint hole 413 is electrically connected to the contact 423 in the crosspoint hole 412.

The connecting pin 511 has the same arrangement as that of the connecting pin 51. That is, contact springs 531 and 541 are held on an insulating shaft 521. Therefore, when this connecting pin 511 is to be used in the arrangement shown in FIG. 10, the contact spring 531 of the connecting pin serves to connect the contact 422 of the first layer to the contact 423 of the second layer or connect the contact 426 of the first layer to the contact 427 of the second layer. The contact spring 541 serves to connect the contact 424 of the third layer to the contact 425 of the fourth layer or connect the contact 428 of the third layer to the contact 429 of the fourth layer.

In this arrangement, when a route is to be formed in the matrix switch, a connecting pin 51 is inserted into a crosspoint hole 41 first. As a result, the Y-direction pattern 21 is connected to the X-direction pattern 31 via a contact spring 53 and contacts 42 and 43, and the Y-direction pattern 211 is connected to the X-direction pattern 311 via a contact spring 54 and contacts (not shown). The connecting pin 511 is then inserted into the crosspoint hole 412 of the pin-board type polarity reversing circuit 810. As a result, the X-direction pattern 31 is connected to the pattern 32 via the contact 423, the contact spring 531, and the contact 422, and the X-direction pattern 311 is connected to the pattern 321 via the contact spring 541. That is, when the connecting pins 51 and 511 are respectively inserted into the crosspoint holes 41 and 412, the Y-direction patterns 21 and 211 are respectively connected to the patterns 32 and 321, thereby completing a route setting operation in the pin-board matrix switch 4 having the pin-board type polarity reversing circuits.

Assume that the connecting pin 51 is inserted into the crosspoint hole 411 to change the route. In this case, since the twist structure constituted by the via holes 61 and 62 is provided for the Y-direction pattern pair 22 and 221, the Y-direction pattern 22 is connected to the pattern 321, whereas the Y-direction pattern 221 is connected to the pattern 32. As a result, the polarity of an output from the pin-board matrix switch having the pin-board type polarity reversing circuits is reversed.

When the connecting pin 511 is removed from the crosspoint hole 412 and inserted into the crosspoint hole 413, the Y-direction pattern 22 is connected to the pattern 32 via the via hole 62, the X-direction pattern 311, the via hole 64, and the contacts 427 and 426. Similarly, the Y-direction pattern 221 is connected to the pattern 321 via the via hole 61, the X-direction pattern 31, the via hole 63, and the contacts 429 and 428. That is, the polarity of the output from the pin-board matrix switch having the pin-board type polarity reversing circuits, which was reversed when the connecting pin 51 was inserted into another crosspoint hole, can be restored to the original state. Therefore, the polarity of an output from the pin-board matrix switch having the pin-board type polarity reversing circuits can be kept constant by only changing the insertion position of the connecting pin for a pin-board type polarity reversing circuit.

In addition, since the pin-board type polarity reversing circuit 810 can be integrally formed with the matrix board without any special process, the above structure is very economical. Furthermore, identical connecting pins can be used for the matrix board and each pin-board type polarity reversing circuit. Therefore, the overall apparatus can be reduced in size and cost by sharing a common connecting pin inserting/removing mechanism and a common connecting pin inserting/removing mechanism control system.

Moreover, since the contact force of a contact spring of each contact spring can be increased to about 100 g in the pin-board type polarity reversing circuit, high connection reliability can be maintained for a long period of time after a polarity setting operation.

Figure 11:
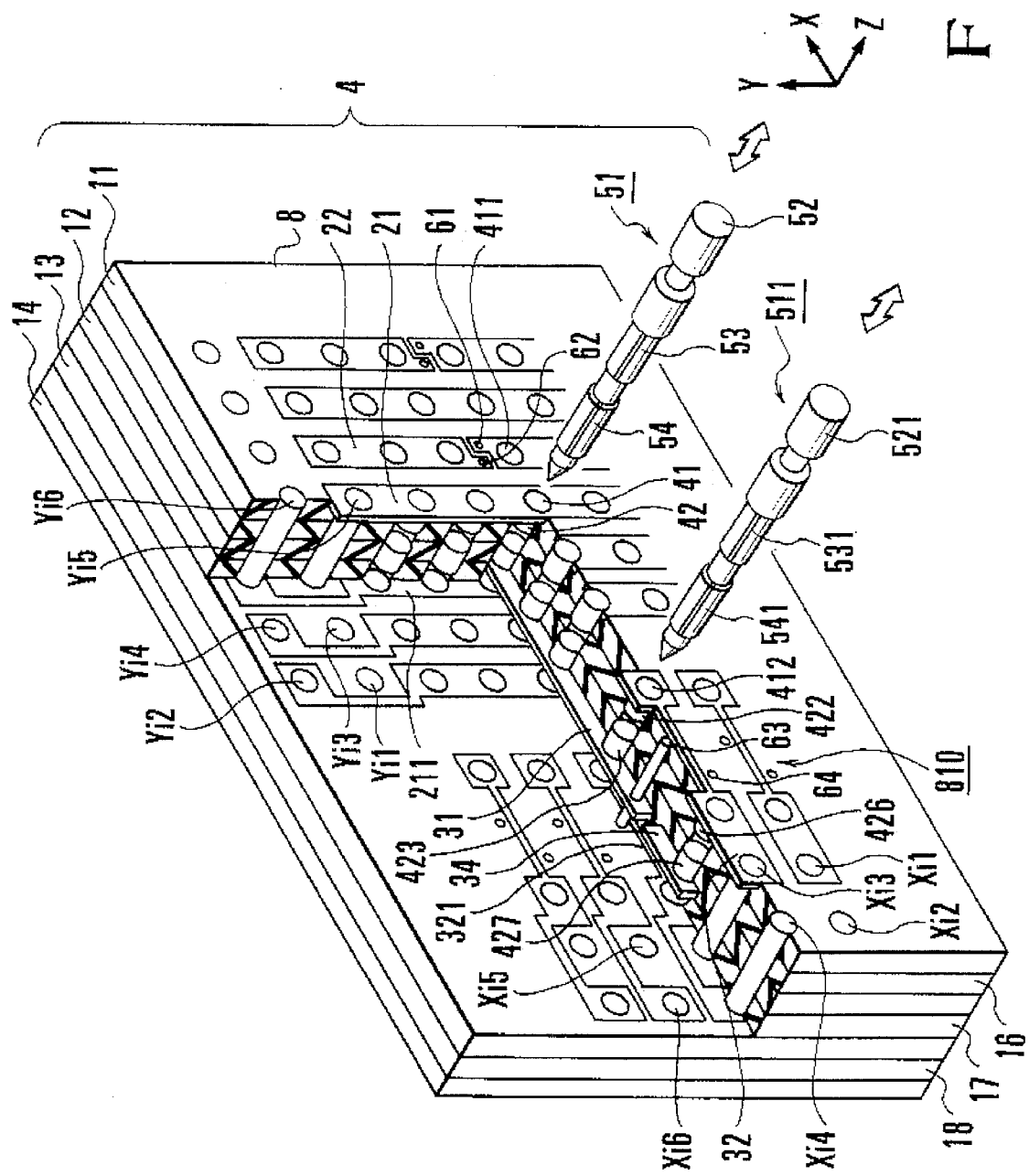
FIG. 11 is a partially cutaway perspective view showing a case wherein input/output ports are added to the embodiment shown in FIG. 9.

FIG. 11 shows an arrangement in which input/output ports are added to the embodiment shown in FIG. 9. Referring to FIG. 11, reference symbols Xi1, Xi2, Xi3, Xi4, Xi5, and Xi6 denote the input/output ports of X-direction patterns; and Yi1, Yi2, Yi3, Yi4, Yi5, and Yi6, the input/output ports of Y-direction patterns.

FIG. 12 shows a modification of the pin-board type polarity reversing circuit. FIG. 12 shows the arrangement of patterns, crosspoint holes, and via holes, with insulating substrates being omitted. Referring to FIG. 12, reference numeral 811 denotes a pin-board type polarity reversing circuit; 32 and 36, first patterns formed on the first layer; 31, an X-direction pattern on the second layer; 37 and 321, second patterns formed on the third layer; 311, an X-direction pattern on the fourth layer; and 65 and 66, via holes; and 65a and 66a, conductors respectively formed in the via holes 65 and 66. The conductor 65a connects the patterns 36 and 321 to each other. The conductor 66a connects the patterns 32 and 37 to each other. Reference numeral 75 and 76 denote cut portions; 415 and 416, crosspoint holes formed in the patterns 36 and 32; 432, 433, 434, and 435, conductor contacts formed in the crosspoint hole 415; and 436, 437, 438, and 439, contacts formed in the crosspoint hole 416.

The structure of the cut portions 75 and 76 will be described in more detail below. The patterns 36 and 32 are cut from each other along the direction perpendicular to the wiring direction, i.e., the Y direction. A gap, i.e., the cut portion 75, is ensured between the patterns 36 and 32 to space the ends of the pattern apart from each other by a certain distance. In contrast to this, portions 321a and 37a protrude from ends of the patterns 321 and 37. The width of each protruding portion is almost ½ the width of each pattern. A crank-like gap, i.e., the cut portion 76, is ensured between the protruding portions to space them apart from each other. As a result, the protruding portion 321a of the pattern 321 is located below the pattern 36, and the protruding portion 37a of the pattern 37 is located below the pattern 32.

Small-diameter via holes 65 and 66 are formed in the distal ends of the protruding portions 321a and 37a of the patterns 321 and 37. The via holes 65 and 66 are connected to the conductors 65a and 66a which extend through the insulating substrates sandwiched between the patterns 321 and 32 to perform interconnection. The patterns 36 and 321, and the patterns 32 and 37 are electrically connected to each other via the via holes 65 and 66 and the conductors 65a and 66a. In this case, in order to prevent the patterns 31 and 311 from overlapping the via holes 65 and 66 and the conductors 65a and 66a, the corresponding portions, of the patterns 31 and 311, are formed into narrow portions 31a and 311a which are narrower than the remaining portions.

In the pin-board type polarity reversing circuit 811 having this arrangement, the contact 432 in the crosspoint hole 415 is electrically connected to the contact 438 in the crosspoint hole 432 via the via hole 65, and the contact 434 in the crosspoint hole 415 is electrically connected to the contact 436 in the crosspoint hole 416 via the via hole 66. Therefore, similar to the pin-board type polarity reversing circuit in the third embodiment, the polarity of an output from the pin-board matrix switch having the pin-board type polarity reversing circuits can be kept constant by selectively inserting the connecting pin 511 into the crosspoint hole 415 or 416. It is apparent that this modification can obtain the same advantages as those of the pin-board type polarity reversing circuit in the tenth embodiment shown in FIG. 10.

Figure 13:
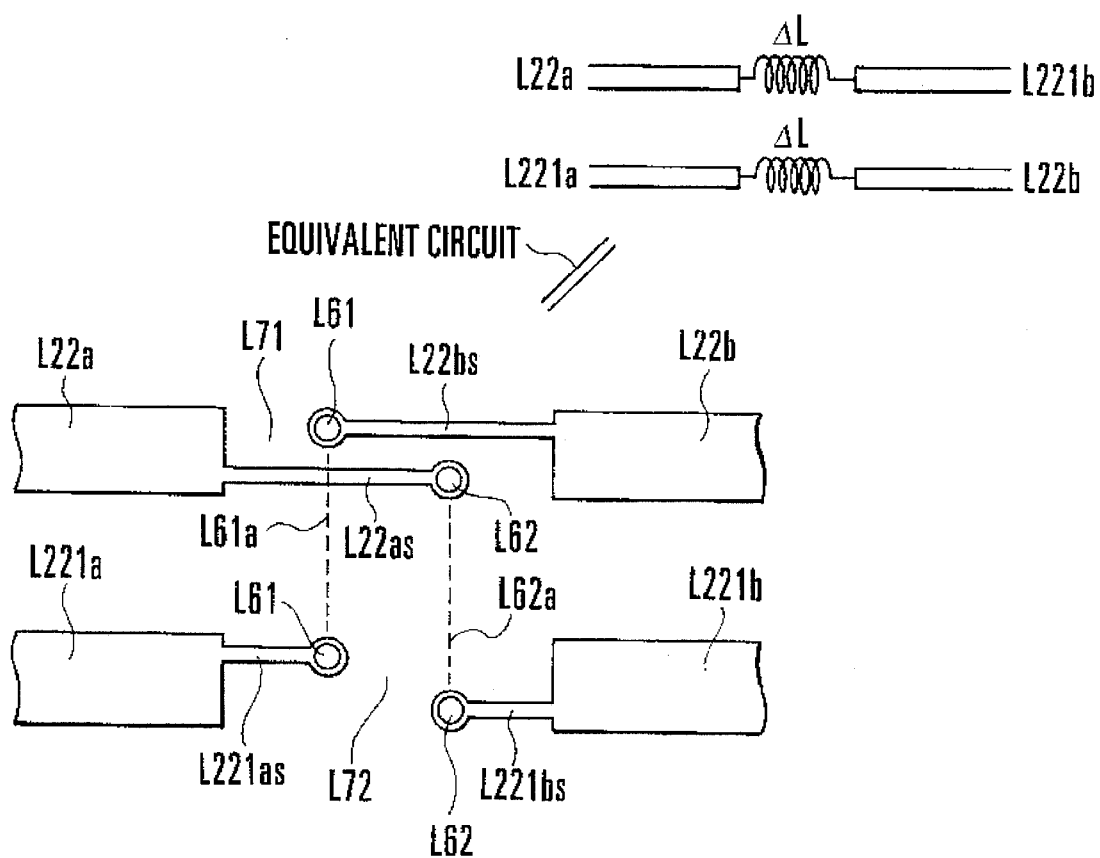
FIG. 13 is an enlarged plan view of the first example of a twist structure in the embodiment shown in FIG. 12.

FIG. 13 shows a twist structure in a pin-board matrix switch according to still another embodiment of the present invention. Referring to FIG. 13, reference symbols L22a and L22b denote Y-direction patterns on the first layer, between which a cut portion L71 is ensured; L221a and L221b, Y-direction patterns on the third layer, between which a cut portion L72 is ensured; L61, a via hole for connecting the patterns L22b and L221a to each other via a conductor L61a; and L62, a via hole for connecting the patterns L22a and L221b to each other via a conductor L62a. In this case, the conductors L61a and L62a are respectively formed in the via holes L61 and L62 by a known method such as plating or vapor deposition. The via hole L61 is connected to the patterns L22b and L221a via patterns L22bs and L221as, respectively. The via hole L62 is connected to the patterns L22a and L221b via patterns L22as and L221bs, respectively. The width of each of the patterns L22bs, L221as, L22as, and L221bs is set to be smaller than that of each of the Y-direction patterns L22b, L221a, L22a, and L221b so as to allow easy formation of each via hole.

With this arrangement, the twist structure acquires a circuit equivalent to the arrangement in which inductances $\Delta L$ are respectively connected in series between the Y-direction patterns L22a and L221b, and the Y-direction patterns L221a and L22b. The impedance of each inductance $\Delta L$ increases with an increase in frequency. Crosstalk noise due to a pulse signal is caused at the leading and trailing edge portions of a pulse. That is, such crosstalk noise is caused in a high-frequency region as compared with the fundamental wave of the pulse signal. For this reason, crosstalk noise can be selectively reduced by using the inductances $\Delta L$.

Figure 14:
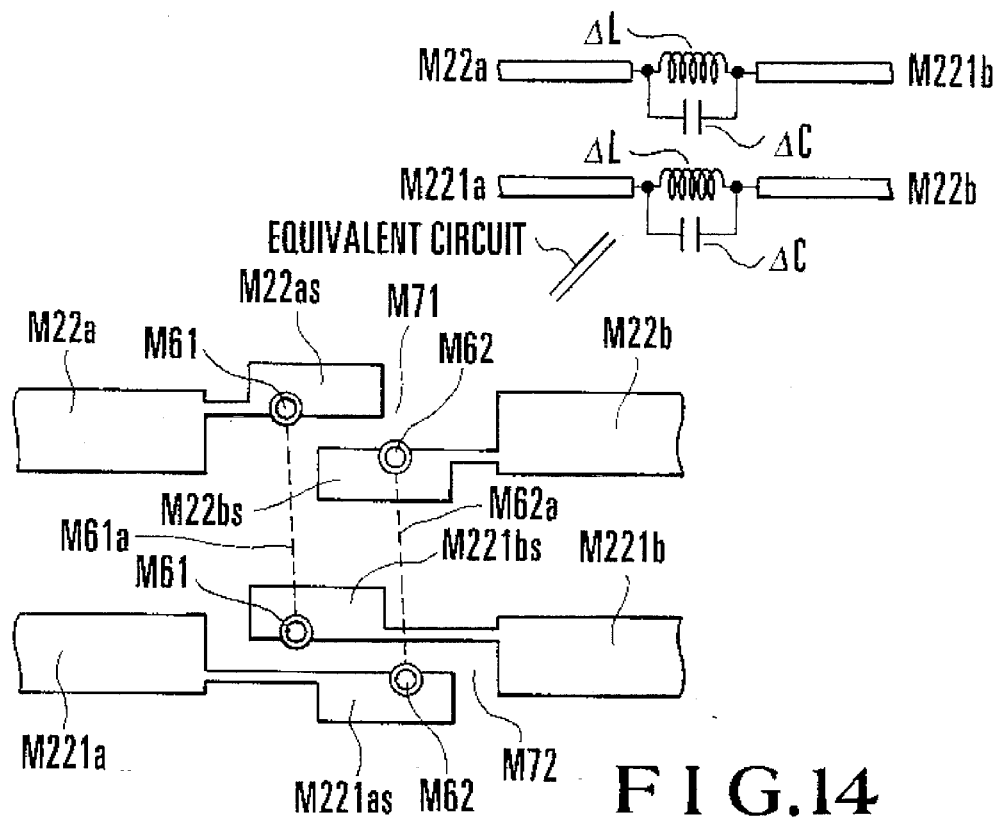
FIG. 14 is an enlarged plan view of the second example of the twist structure in the embodiment shown in FIG. 12.

FIG. 14 shows another twist structure in a pin-board matrix switch of the present invention. Referring to FIG. 14, reference symbols M22a and M22b denote Y-direction patterns on the first layer, between which a cut portion M71 is formed; M221a and M221b, Y-direction patterns on the third layer, between which a cut portion M72 is formed; M61, a via hole for connecting the Y-direction patterns M22a and M221b to each other via a conductor M61a; and M62, a via hole for connecting the Y-direction patterns M22b and M221a to each other via a conductor M62a. In this case, the conductors M61a and M62a are respectively formed in the via holes M61 and M62 by a known method such as plating or vapor deposition.

The via hole M61 is connected to the patterns M22a and M221b via patterns M22as and M221bs. The via hole M62 is connected to the patterns M22b and M221a via patterns M22bs and M221as. Each of the patterns M22as, M221bs, M22bs, and M221as has a larger width than each of patterns which connect the patterns M22as, M221bs, M22bs, and M221as to the Y-direction patterns M22a, M221b, M22b, and M221a, and extend further from the positions of the via holes M61 and M62.

With this arrangement, the twist structure acquires a circuit equivalent to the arrangement in which derived M-type filters, each constituted by an inductance $\Delta L$ and an electrostatic capacitance $\Delta C$, are respectively arranged between the Y-direction patterns M22a and M221b, and the Y-direction patterns M221a and M22b. In this case, a low-pass filter or a bandpass filter is formed by properly designing the widths and lengths of the patterns M22as, M221*bs*, M22*bs*, and M221*as*. Therefore, crosstalk noise caused in a high-frequency region as compared with the fundamental wave of a pulse signal can be selectively reduced.

Figure 15:
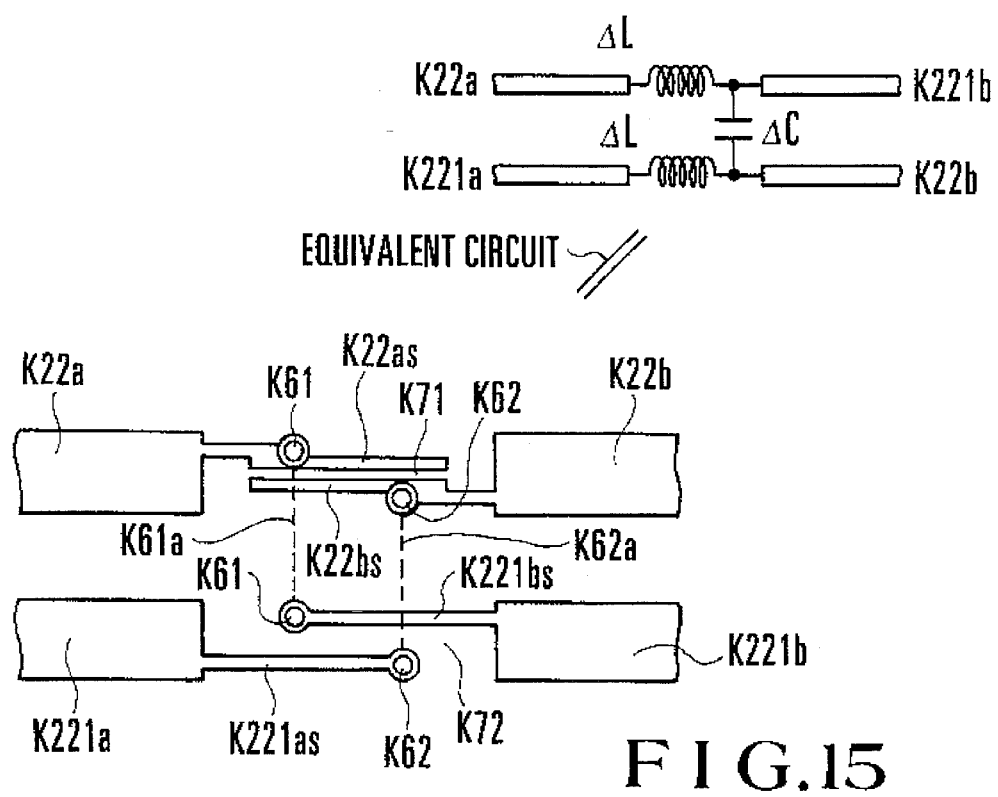
FIG. 15 is an enlarged plan view of the third example of the twist structure in the embodiment shown in FIG. 12.

FIG. 15 shows still another twist structure in a pin-board matrix switch of the present invention. Referring to FIG. 15, reference symbols K22*a* and K22*b* denote Y-direction patterns on the first layer, between which a cut portion K71 is formed; K221*a* and K221*b*, Y-direction patterns on the third layer, between which a cut portion K72 is formed; K61, a via hole for connecting the patterns K22*a* and K221*b* to each other via a conductor K61*a*; and K62, a via hole for connecting the patterns K22*b* and K221*a* to each other via a conductor K62*a*. In this case, the conductors K61*a* and K62*a* are respectively formed in the via holes K61 and K62 by a known method such as plating or vapor deposition.

The via hole K61 is connected to the patterns K22*a* and K221*b* via patterns K22*as* and K221*bs*. The via hole K62 is connected to the patterns K22*b* and K221*a* via patterns K22*bs* and K221*as*. The width of each of the patterns K22*as*, K221*bs*, K22*bs*, and K221*as* is set to be smaller than that of each of the Y-direction patterns K22*a*, K221*b*, K22*b*, and K221*a*. In addition, the patterns K22*as* and K22*bs* extend further from the positions of the via holes K61 and K62, and the gap between the patterns K22*as* and K22*bs* is set to be small.

With this arrangement, the twist structure acquires a circuit equivalent to the arrangement in which constant K filters, each constituted by an inductance $\Delta L$ and an electrostatic capacitance $\Delta C$, are respectively inserted between the patterns K22*a* and K22*b*, and the patterns K221*a* and K221*b*. In this case, a low-pass filter or a bandpass filter is formed by properly designing the widths and lengths of the patterns K22*as*, K221*as*, K22*bs*, and K221*bs*. Therefore, crosstalk noise caused in a high-frequency region as compared with the fundamental wave of a pulse signal can be selectively reduced.

In the above embodiment, the shapes of the patterns and the positions of the via holes are just examples and may be variously changed as long as twist structures and polarity reversing can be realized. As is apparent, with regard to layer arrangement, the order of combinations of pattern layers of the first and third layers and the pattern layers of the second and fourth layers can be changed. Furthermore, a matrix board with a higher density can be realized by using landless via holes or interstitial via holes (IVH) which extend through only insulating substrate portions sandwiched between required pattern layers to achieve electrical conduction.

In the case of an n-wire line or the like, a 2n-layer matrix board is used, and twist structures and polarity reversing circuits are sequentially provided between two arbitrary wires, thereby obtaining the same effects as those for a two-wire line.

As described above, according to the above embodiment, one or both of an X-direction pattern and a Y-direction pattern, which oppose each other in the Z direction, are divided by cut portions almost perpendicular to the signal transmission direction. Different patterns, separated from each other via the cut portions, are electrically connected to each other via through holes extending through insulating substrates sandwiched between these pattern pairs and incorporating interconnection conductors. With this arrangement, a twist structure is provided for one or both of the X-direction pattern and the Y-direction pattern so that crosstalk caused in a pair of patterns before and after the twist structure can be canceled out. Therefore, the crosstalk caused in the pin-board matrix switch of the embodiment can be greatly reduced as compared with the conventional pin-board matrix switch. In addition, a twist structure can be integrally formed in the working process for a printed circuit board at the same time when a matrix board is formed, and no other components are required. Therefore, this structure is economically advantageous. Furthermore, external noise can also be canceled out in the same manner as in the case of crosstalk, thereby improving noise immunity against an environmental electromagnetic field.

According to the embodiments described above with reference to FIGS. 7, 9, and 11, with the polarity reversing circuits, the polarity of an output from the pin-board matrix switch having the polarity reversing circuits can always be kept constant regardless of a route set in the pin-board matrix switch.

According to the embodiments, since the pin-board type polarity reversing circuit is integrally formed with the matrix board, the pin-board matrix switch having the pin-board type polarity reversing circuits can be reduced in size and cost. In addition, the connecting pin for the pin-board matrix switch can also be used for the pin-board type polarity reversing circuits without any modification. Therefore, the pin-board matrix switch having the pin-board type polarity reversing circuits can be further reduced in size and cost by using a common connecting pin inserting/removing mechanism and a common connecting pin inserting/removing mechanism control system for the pin-board type polarity reversing circuits and the pin-board matrix switch. Furthermore, since the contact force of each contact spring of the connecting pin can be increased, high connection reliability can be maintained for a long period of time after a polarity setting operation.

According to the embodiments shown in FIGS. 13, 14, and 15, an electrostatic capacitance or an inductance can be added to a pattern pair at a cut portion by changing the width or length of a pattern at the cut portion with respect to the width of the pattern before/after the cut portion. With this arrangement, a filter can be added to the pattern pair. Therefore, crosstalk noise caused in a high-frequency region as compared with the fundamental wave of a pulse signal can be removed.

Figure 16:
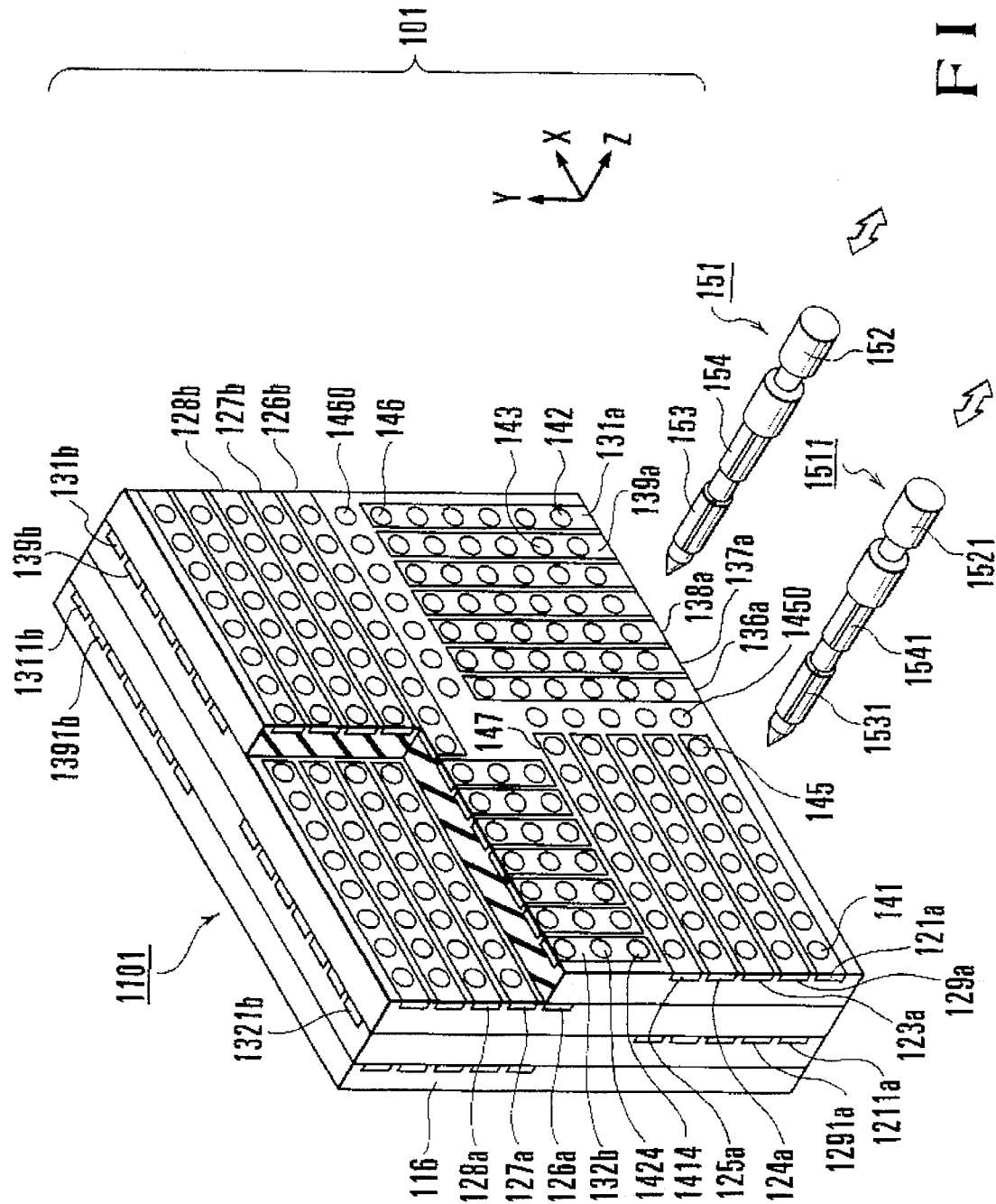
FIG. 16 is a partially cutaway perspective view of a pin-board matrix switch having separating structure according to still another embodiment of the present invention.
Figure 17:
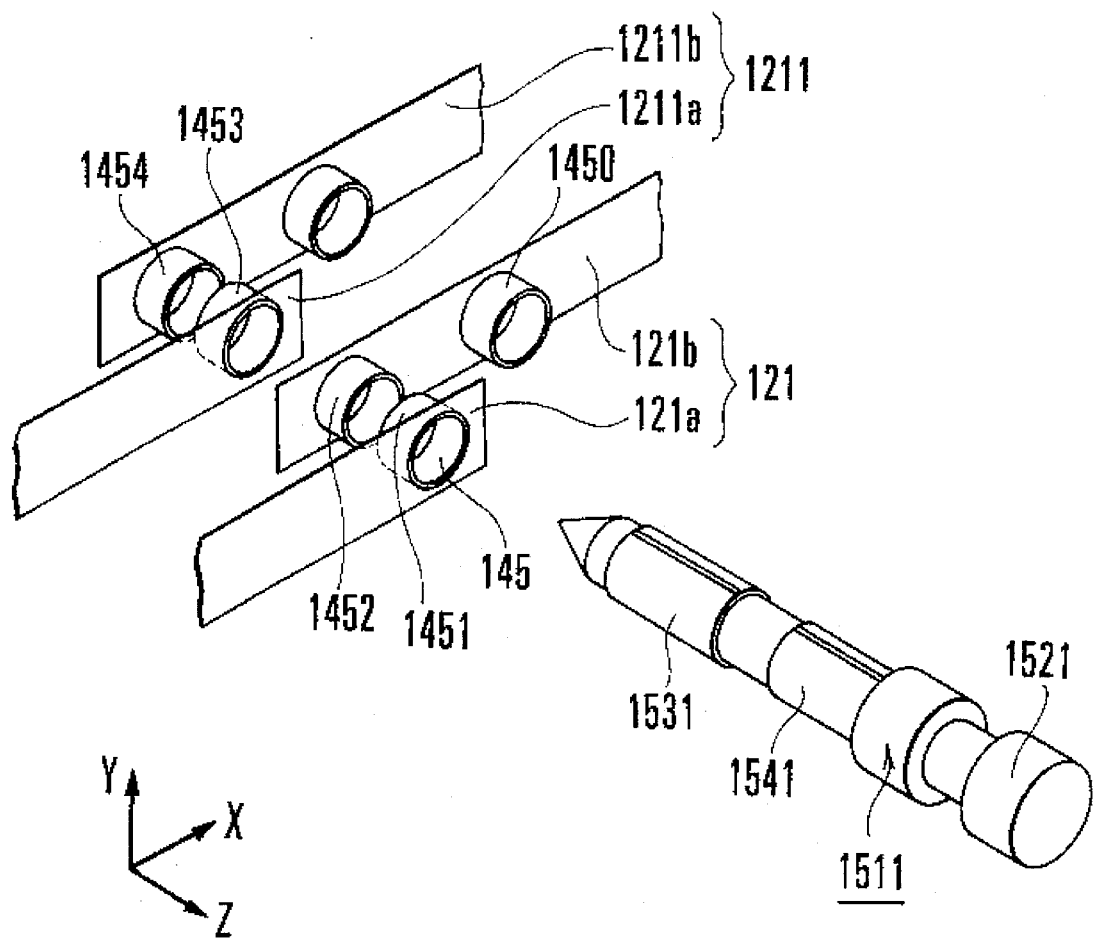
FIG. 17 is an enlarged perspective view of the main portion of a separation structure in the embodiment shown in FIG. 16.
Figure 18:
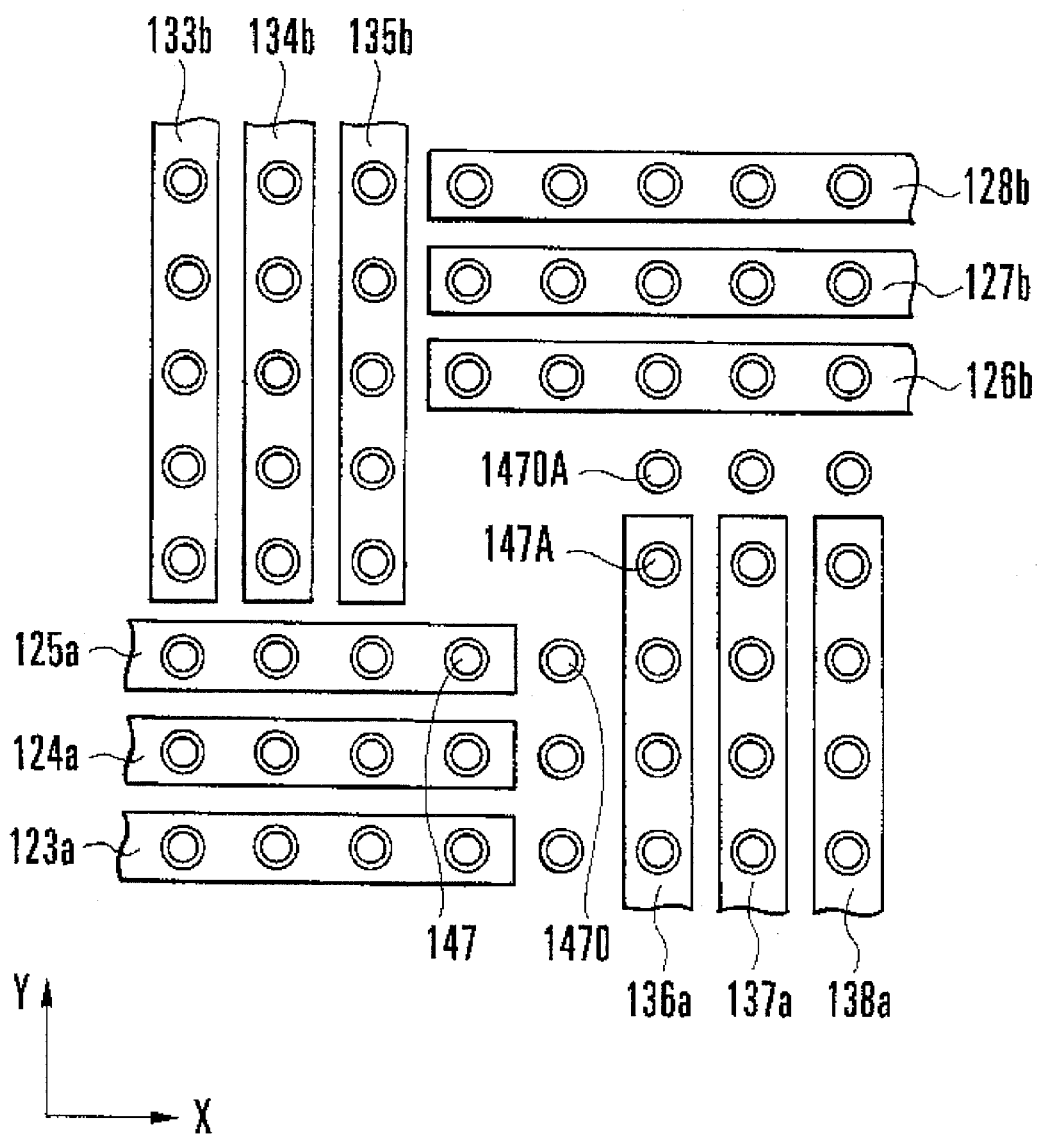
FIG. 18 is a plan view showing the arrangement of patterns on the uppermost layer and crosspoint holes at a central portion of the pin-board matrix switch in FIG. 16.
Figure 19:
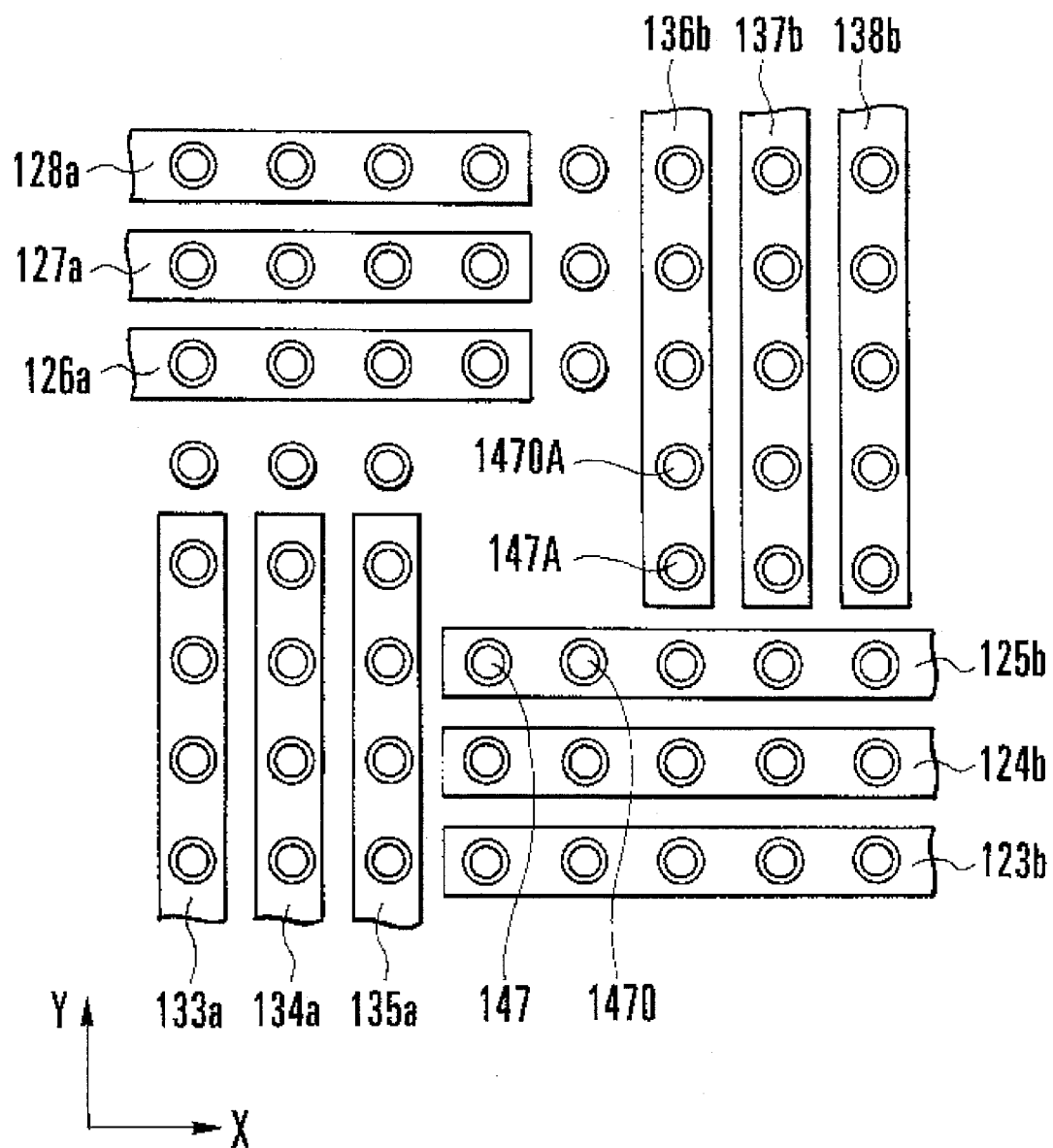
FIG. 19 is a plan view showing the arrangement of patterns on the layer immediately under the uppermost layer and crosspoint holes at a central portion of the pin-board matrix switch in FIG. 16

FIG. 16 shows a pin-board matrix switch with separation structures according to still another embodiment of the present invention. FIG. 17 shows the positional relationship between patterns and crosspoint holes in the embodiment shown in FIG. 16, from which insulating substrates are removed. FIG. 18 shows the arrangement of the divided patterns and crosspoint holes of the uppermost layer near a central portion of a matrix board in the embodiment shown in FIG. 16. FIG. 19 shows the arrangement of the divided patterns and crosspoint holes of the layer immediately below the uppermost layer near the central portion of the matrix board in the embodiment shown in FIG. 16. Referring to FIGS. 16 to 19, a pin-board matrix switch denoted by reference numeral 101 as a whole is constituted by a matrix board 1101 and connecting pins 151 and 1511. The matrix board 1101 is a four-layer printed circuit board.

An X-direction pattern pair and a Y-direction pattern pair constituting a signal line used in the respective layers are divided at the midpoints of the patterns in a direction almost perpendicular to the signal transmission direction. Pairs of divided patterns 121*a* and 1211*a*, 121*b* and 1211*b*, 131*a* and 1311*a* (not shown), and 131*b* and 1311*b* are adjacent to each other in the Z direction via the cut portions, and are arranged such that the respective end portions of the patterns oppose each other while overlapping each other.

Crosspoint holes 145 and 146 are formed in the overlapping portions between the divided patterns 121a, 1211a, 121b, 1211b, 131a, 131b, 1311a, and 1311b. The crosspoint holes 145 incorporate contacts 1451, 1452, 1453, and 1454 which are electrically connected to the divided patterns 121a, 1211a, 121b, and 1211b and are electrically separated from each other. A connecting pin 1511 having the same structure as that of the connecting pin 151 is selectively removed from the crosspoint holes 145 and 146 in accordance with a set route, thereby realizing a separation structure for separating an open route. Note that the connecting pins 151 and 1511 have the same structure as that of the connecting pins 51 and 511 described in the previous embodiments. Dummy crosspoint holes 1450 and 1460 may be formed near the crosspoint holes 145 and 146 to hold the connecting pin 1511 removed from the crosspoint holes 145 and 146.

As shown in FIGS. 18 and 19, X-direction patterns 123a, 124a, 125a, 126a, 127a, 128a, 123b, 124b, 125b, 126b, 127b, and 128b, and the Y-direction patterns 133a, 134a, 135a, 136a, 137a, 138a, 133b, 134b, 135b, 136b, 137b, and 138b, and the crosspoint holes 147, 1470, 147A, and 1470A for the separation structures are arranged at the central portion where the separation structures arranged in the X and Y directions concentrate, thereby preventing interference between the crosspoint holes 147 and 1470 constituting the separation structure in the X direction and the crosspoint holes 147A and 1470A constituting the separation structure in the Y direction.

With such separation structures, the length of an open line can be reduced to ½ even in a route having a short signal transmission distance, which is set by inserting the connecting pin 151 into a crosspoint hole 141 of the matrix board 1101, by removing the connecting pin 1511 from the crosspoint hole 145. Therefore, even if the size of a matrix board cannot be neglected with an increase in signal speed, since the length of an open line can be decreased, variations in characteristic impedance due to the stray capacitance in the open line can be reduced.

Assume that the connecting pin 151 is inserted into the crosspoint holes 141 and 143 of the matrix board 1101 to set two routes connecting the X-direction pattern pair 121a and 1211a and a Y-direction pattern pair 132b and 1321b, and an X-direction pattern pair 129a and 1291a, and a Y-direction pattern pair 39b and 391b. In this case, crosstalk noise is induced to the X-direction patterns 121a and 1211a and the Y-direction patterns 131b and 1311b via an open line in the X direction. When the connecting pin 1511 is removed from the crosspoint hole 145 of the separation structure, the crosstalk noise induced via the open line can be reduced.

Therefore, even a high-speed signal line which cannot be accommodated in the conventional pin-board matrix switch can be accommodated in the pin-board matrix switch with separation structures of the present invention.

In addition, a separation structure can be integrally formed with the matrix board without any special process, and hence is very economical. Furthermore, identical connecting pins can be used for the matrix board and each separation structure. Therefore, the overall apparatus can be reduced in size and cost by sharing a common connecting pin inserting/removing mechanism and a common connecting pin inserting/removing mechanism control system. Moreover, since the contact force of each contact spring of the connecting pin can be increased to about 100 g in the separation structure, high connection reliability can be maintained for a long period of time.

In the embodiment shown in FIG. 16, the separation structure is arranged at one portion in each of the X and Y directions. It is apparent, however, that separation structures may be arranged at a plurality of portions in each of the X and Y directions, as needed, or a separation structure may be arranged in either the X direction or the Y direction.

Figure 20:
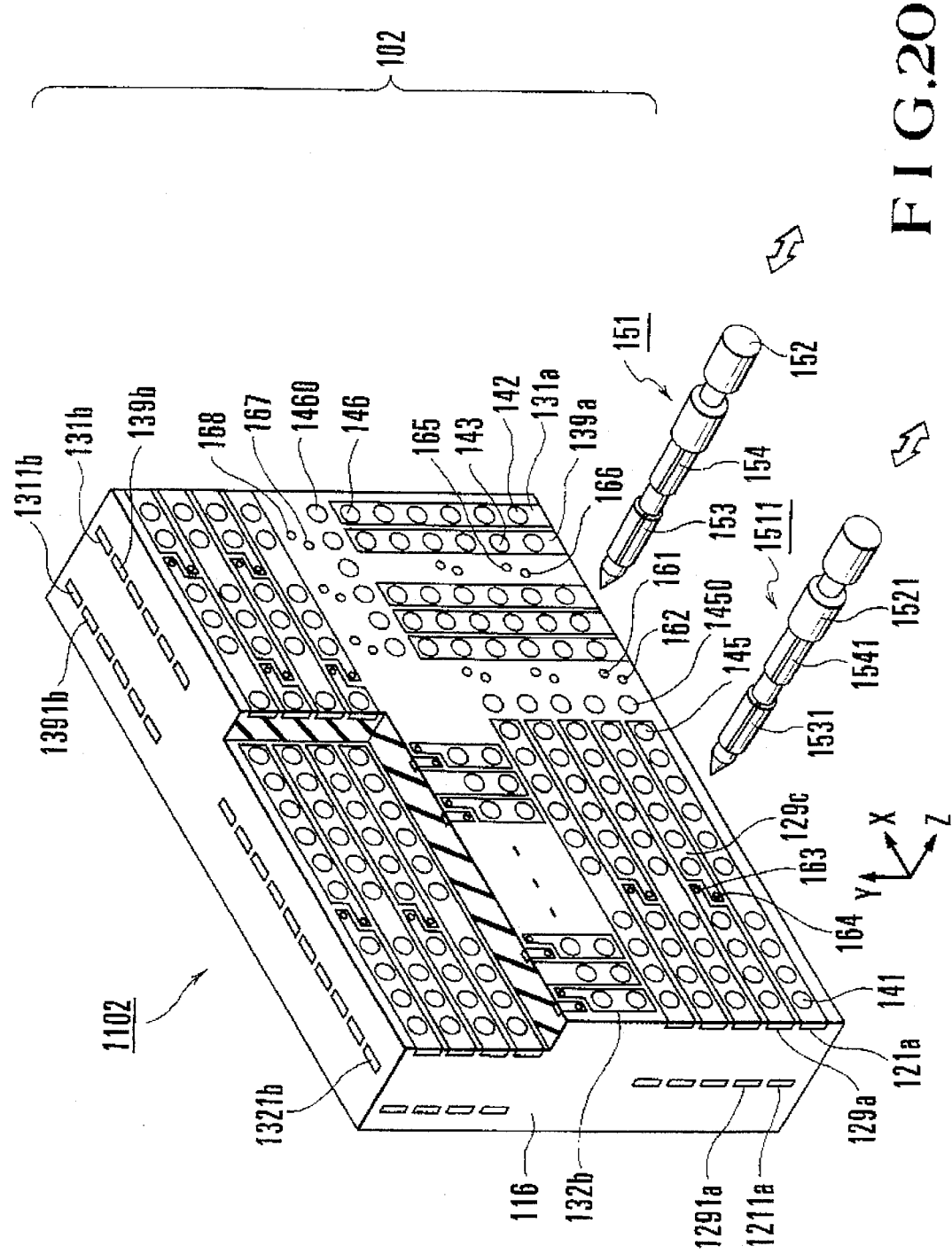
FIG. 20 is a partially cutaway perspective view of a pin-board matrix switch having twist structures according to still another embodiment of the present invention.
Figure 21:
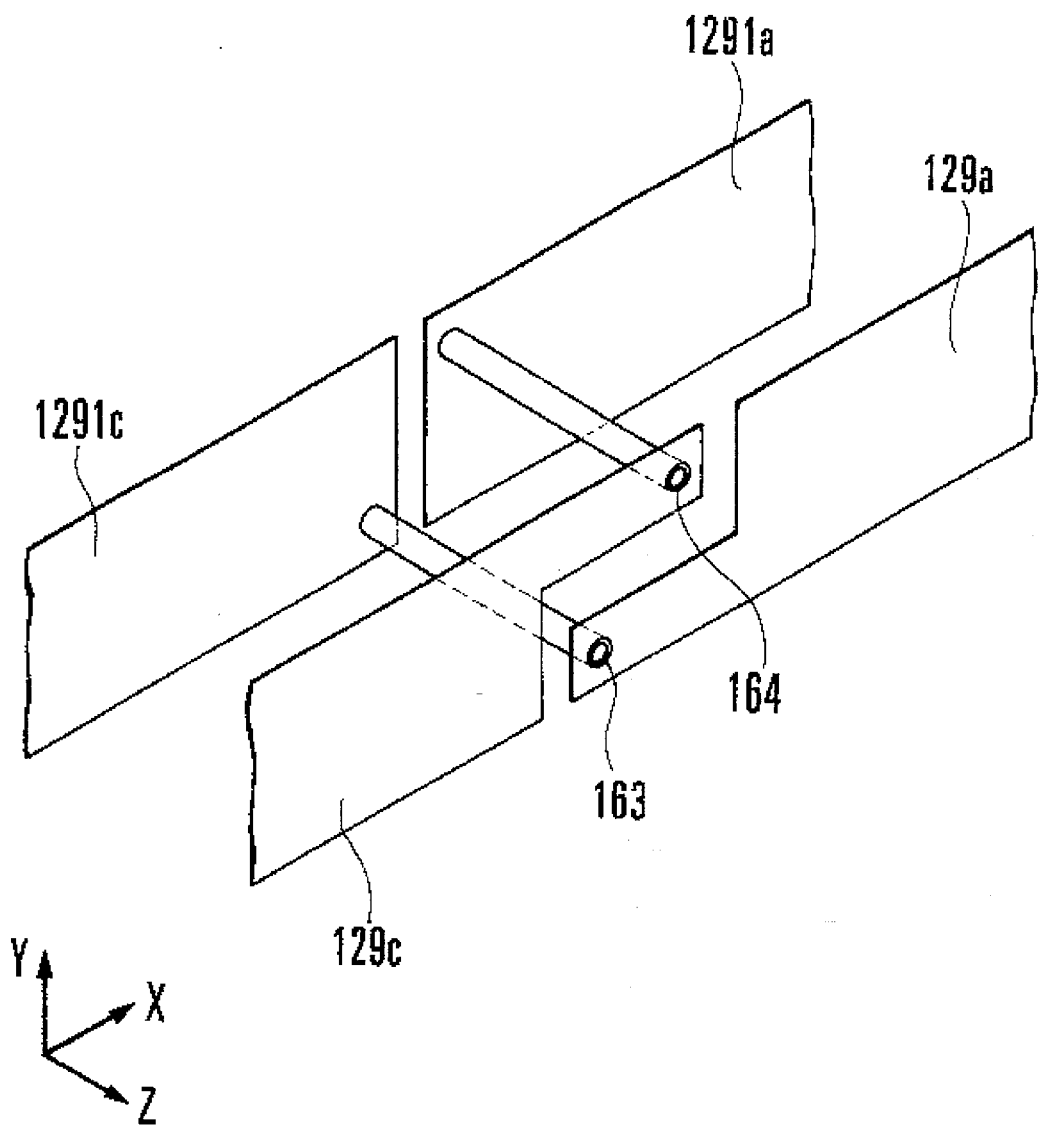
FIG. 21 is a perspective view showing the main portion of a twist structure in the embodiment shown in FIG. 20.

FIG. 20 shows an embodiment incorporating the basic arrangement shown in FIG. 16, and specifically a pin-board matrix switch having twist structures. FIG. 21 shows the arrangement of patterns having a twist structure and small-diameter through holes. Referring to FIG. 20, separation structures constituted by crosspoint holes 145 and 146 are respectively arranged at substantially midpoints of a X-direction pattern pair 121a and 1211a and a Y-direction pattern pair 131a and 1311a. FIG. 20 shows a state wherein X-direction pattern pairs 121a and 1211a, each having one twist structure constituted by small-diameter through holes 161 and 162, and X-direction pattern pairs 129a and 1291a, each having two twist structures constituted by small-diameter through holes 163 and 164, and 165 and 166, are alternately arranged, while Y-direction pattern pairs 131a and 1311a having no twist structure and Y-direction pattern pairs 139a and 1391a, each having one twist structure constituted by small-diameter through holes 167 and 168, are alternately arranged.

Assume that connecting pins 151 are inserted into crosspoint holes 141 and 143 of a matrix board 1102 to set two routes connecting the X-direction pattern pair 121a and 1211a and the Y-direction pattern pair 132b and 1321b to each other, and the X-direction pattern pair 129a and 1291a and a Y-direction pattern pair 139b and 1391b to each other. In this case, even if a connecting pin 1511 is removed from the crosspoint hole 145 of the separation structure to decrease the length of an open route, a certain degree of crosstalk noise is inevitably induced via a residual open line which cannot be separated. However, with the twist structure constituted by the small-diameter through holes 163 and 164, in a pin-board matrix switch 102 having twist structures, the crosstalk induced via the open line which cannot be separated is canceled out between adjacent patterns having the twist structure to be reduced. In addition, crosstalk and external noise can be further reduced by arranging a twist structure also in an open line portion.

Assume that the connecting pin 151 is removed from the crosspoint hole 141 and inserted into the crosspoint hole 142 of the matrix board 1102 to connect the X-direction pattern pair 121a and 1211a and the Y-direction pattern pair 131b and 1311b to each other. In this case, as is apparent, with the twist structures included in the signal transmission routes, the crosstalk induced from the X-direction pattern pair 129a and 1291a and the Y-direction pattern pair 139b and 1391b to the X-direction pattern pair 121a and 1211a and the Y-direction pattern pair 131b and 1311b can be reduced.

In the embodiment shown in FIG. 20, a separation structure is arranged at one portion in each of the X and Y directions. It is apparent, however, that separation structures may be arranged at a plurality of portions in each of the X and Y directions, as needed, or a separation structure may be arranged in either the X direction or the Y direction. A method of providing twist structures is not limited to the method in this embodiment. As is apparent, twist structures can be arranged at arbitrary places, as needed.

Figure 22:
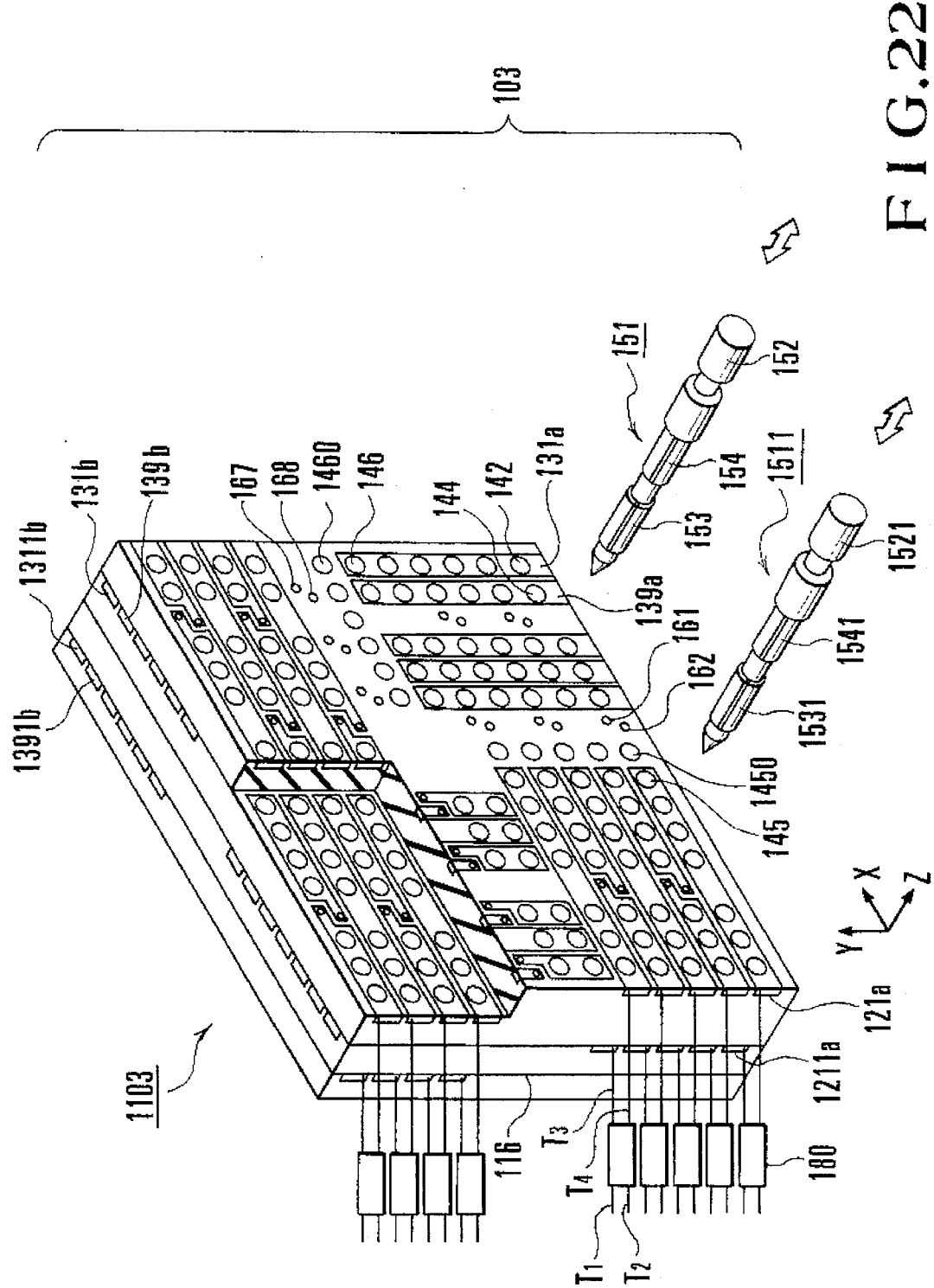
FIG. 22 is a partially cutaway perspective view of still another embodiment of the present invention.

FIG. 22 shows a pin-board matrix switch having polarity reversing circuits according to still another embodiment of the present invention. Each polarity reversing circuit used in this embodiment has the same arrangement as that shown in FIG. 8.

In this arrangement, when a connecting pin 151 is inserted into a crosspoint hole 144 of a matrix board 1103, and a connecting pin 1511 is inserted into a crosspoint hole 145 of a separation structure, since two twist structures are arranged in a signal transmission route, an X-direction pattern 121a is connected to a Y-direction pattern 139b, and an X-direction pattern 1211a is connected to a Y-direction pattern 1391b. When the connecting pin 151 is removed from the crosspoint hole 144 and inserted into a crosspoint hole 142, the number of twist structures is changed to one. Consequently, the X-direction pattern 121a is connected to a Y-direction pattern 1311b, and the X-direction pattern 1211a is connected to a Y-direction pattern 131b. As a result, the polarity of an output from the pin-board matrix switch having the polarity reversing circuits is reversed. That is, the polarity of an output from a pin-board matrix switch 103 can always be kept constant by reversing the polarity of a polarity reversing circuit 180 arranged on the extended lines of the X-direction pattern pair 121a and 1211a of the matrix board. If, for example, when a polarity reversing circuit 80 like the one shown in FIG. 8 is used, the polarity of the polarity reversing circuit 80 can be reversed by switching contacts of transfer relays 801 and 802 simultaneously. Therefore, the polarity of an output from the pin-board matrix switch having the polarity reversing circuits can be maintained.

As is apparent, terminals T1 and T2 of the relay type polarity reversing circuit 80 may be connected to the matrix board 1103 side, and terminals T3 and T4 of the circuit 80 may be connected to the external circuit side. Instead of the relay type polarity reversing circuit, one of polarity reversing circuits constituted by various switching elements, such as a semiconductor polarity reversing circuit using semiconductor switches, may be used. In addition, in this embodiment, a relay type polarity reversing circuit to be externally mounted is described as an example of the polarity reversing circuit 180. However, the present invention is not limited to this, but the circuit 180 can be variously changed in design. For example, a pin-board type polarity reversing circuit may be integrally formed with a matrix board on the extended lines of an X- or Y-direction pattern pair of the matrix board.

Figure 23:
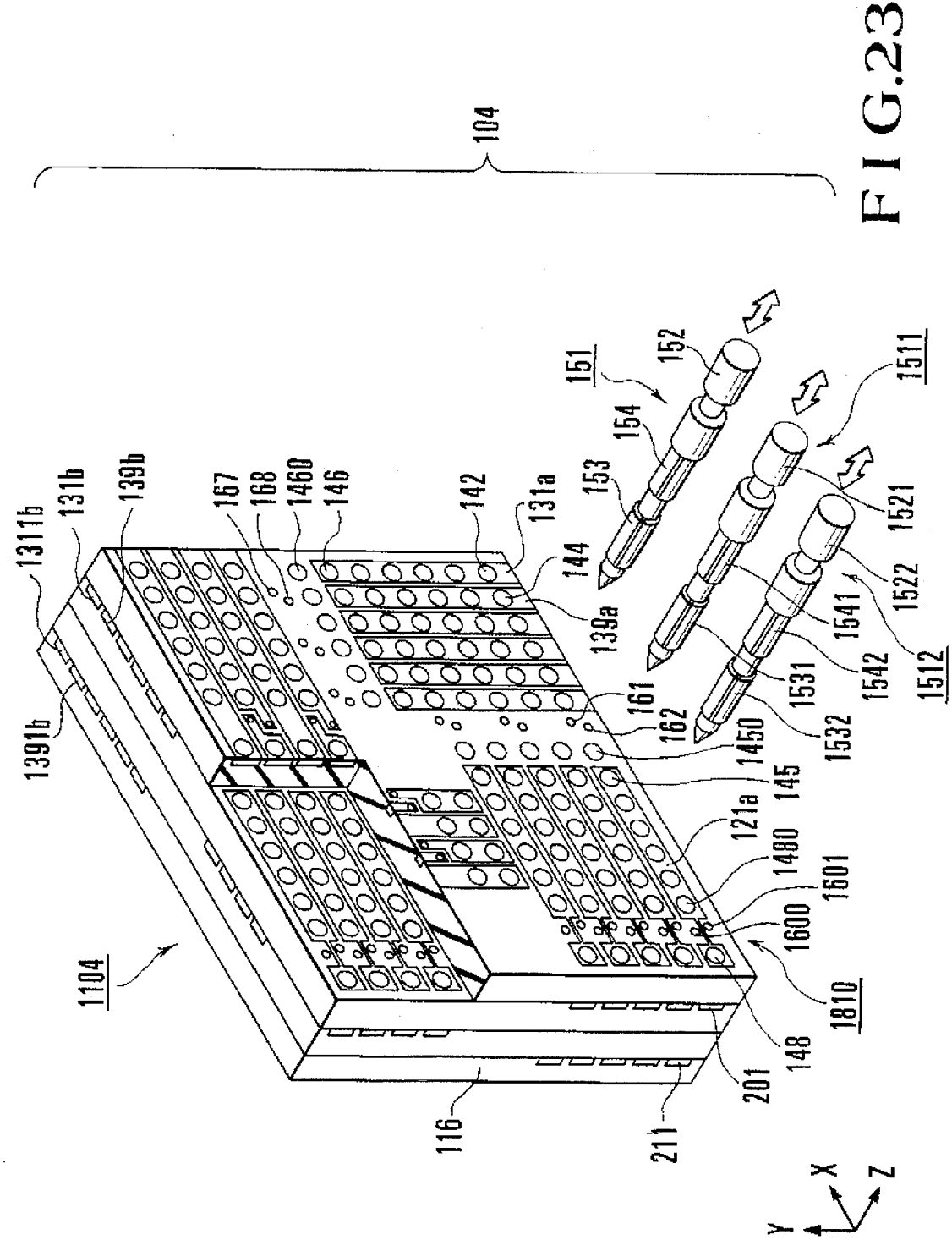
FIG. 23 is a partially cutaway perspective view of still another embodiment of the present invention, which incorporates polarity reversing circuits.
Figure 24:
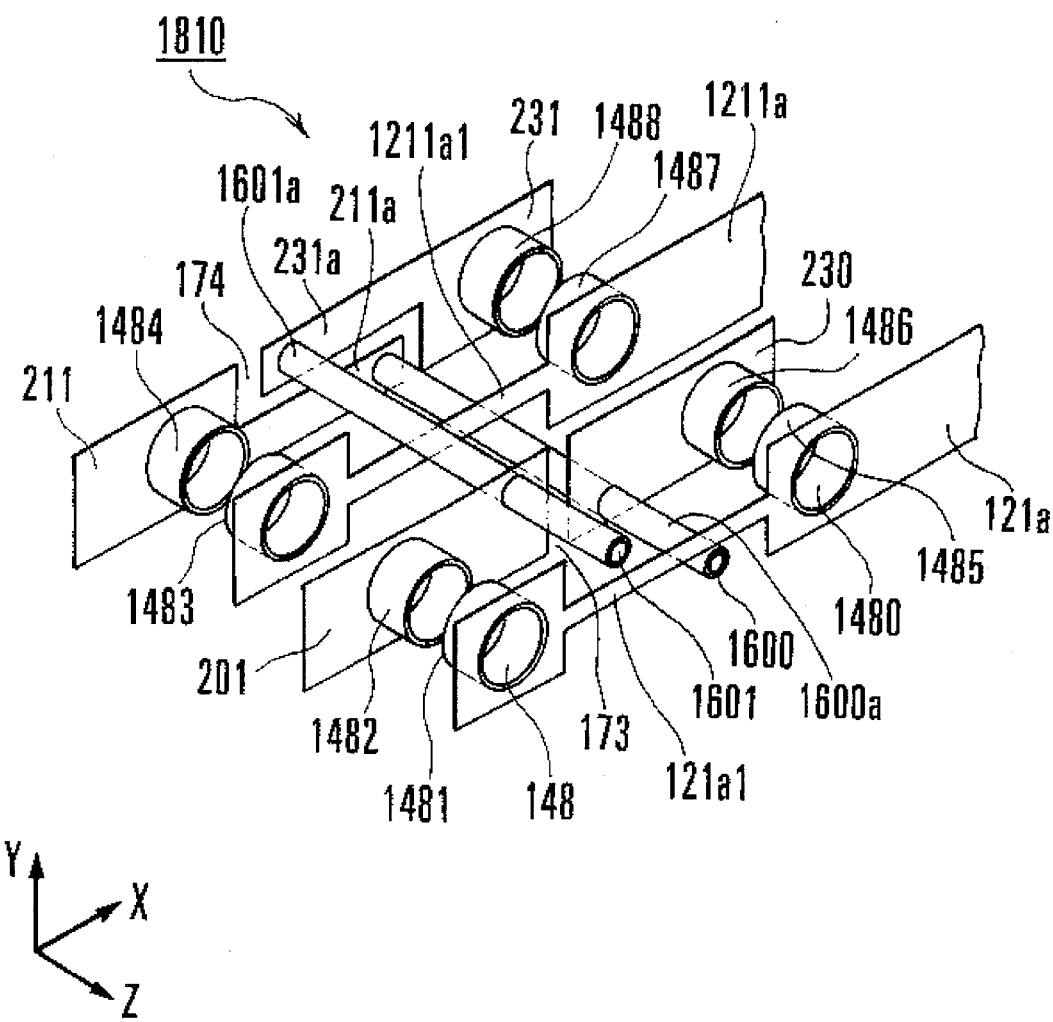
FIG. 24 is a perspective view showing the main portion of still another embodiment of the present invention.

FIG. 23 shows a modification of the embodiment shown in FIG. 22, in which polarity reversing circuits are incorporated in a pin-board matrix switch. FIG. 24 shows the arrangement of the patterns and crosspoint holes of a pin-board type polarity reversing circuit. This modification is characterized in that a pin-board type polarity reversing circuit 1810 is arranged in a matrix board 1104 on the extended lines of the X-direction pattern pair 121a and 1211a. That is, the pin-board type polarity reversing circuit 1810 is constituted by a connecting pin 1512 having the same structure as that of the connecting pin 151, and a four-layer pattern as one unit, i.e., a pattern 121a of the first layer, patterns 201 and 230 of the second layer as the first pattern, a pattern 1211a of the third layer, and patterns 211 and 231 of the fourth layer as the second pattern. The patterns 201 and 230 of the second layer and the patterns 211 and 231 of the fourth layer are electrically insulated and divided from each other via cut portions 173 and 174, respectively.

The structures of the cut portions 173 and 174 will be described in more detail below. The patterns 201 and 230 are cut along the direction perpendicular to the wiring direction, i.e., the Y direction, and a gap, i.e., the cut portion 173, is ensured between the patterns 201 and 230 to space them apart from each other by a certain distance. In contrast to this, portions 211a and 231a protrude from ends of the patterns 211 and 231. The width of each protruding portion is almost ½ the width of each of the patterns. A crank-like gap, i.e., the cut portion 174, is ensured between the protruding portions 211a and 231a to space them apart from each other. As a result, the protruding portion 211a of the pattern 211 is located below the pattern 230, and the protruding portion 231a of the pattern 231 is located below the pattern 201.

Small-diameter via holes 1600 and 1601 are formed in the distal ends of the protruding portions 211a and 231a of the patterns 211 and 231. The via holes 1600 and 1601 are connected to conductors 1601a and 1600a which extend through insulating substrates sandwiched between the patterns 201 and 211 to perform interconnection. The patterns 201 and 231, and the patterns 230 and 211 are electrically connected to each other via the via holes 1600 and 1601 and the conductors 1600a and 1601a. In this case, in order to prevent the patterns 121a and 1211a from overlapping the via holes 1600 and 1601 and the conductors 1600a and 1601a, the corresponding portions of the patterns are formed into portions 121a1 and 1211a1 which are narrower than the remaining portions. Note that the patterns 201 and 211 of the second and fourth layers constitute an input/output wiring pair. Referring to FIGS. 23 and 24, reference numerals 148 and 1480 denote first and second crosspoint holes of a pin-board type polarity reversing circuit. The crosspoint holes 148 and 1480 are formed as through holes extending through the first and subsequent layers downward. Reference numerals 1485, 1486, 1487, and 1488 denote contacts formed in the first crosspoint hole 1480; and 1481, 1482, 1483, and 1484, contacts formed in the second crosspoint hole 148.

In this arrangement, when the connecting pins 151, 1511, and 1512 are respectively inserted into the crosspoint holes 144, 145, and 148, the input/output wires 201 and 211 are respectively connected to the Y-direction patterns 139b and 1391b.

When the connecting pin 151 is removed from the crosspoint hole 144 and inserted into a crosspoint hole 142, the input/output wires 201 and 211 are respectively connected to the Y-direction patterns 1311b and 131b. As a result, the polarity of a pin-board matrix switch 104 having the pin-board type polarity reversing circuits is reversed. When the connecting pin 1512 is removed from the crosspoint hole 148 and inserted into the crosspoint hole 1480, the input/output wires 201 and 211 are respectively connected to the Y-direction patterns 131b and 1311b.

That is, the polarity of an output from the pin-board matrix switch having the pin-board type polarity reversing circuits, which was reversed when the connecting pin 151 was inserted into another crosspoint hole, can be restored to the original state.

Therefore, the polarity of an output from the pin-board matrix switch having the pin-board type polarity reversing circuits can be kept constant by only changing the insertion position of the connecting pin for a pin-board type polarity reversing circuit.

In addition, since the pin-board type polarity reversing circuit 1810 can be integrally formed with the matrix board without any special process, the above structure is very economical. Furthermore, identical connecting pins can be used for the matrix board and each pin-board type polarity reversing circuit. Therefore, the overall apparatus can be reduced in size and cost by sharing a common connecting pin inserting/removing mechanism and a common connecting pin inserting/removing mechanism control system. Moreover, since the contact force of each contact spring of the connecting pin can be increased to about 100 g in the pin-board type polarity reversing circuit, high connection reliability can be maintained for a long period of time after a polarity setting operation.

Figure 25:
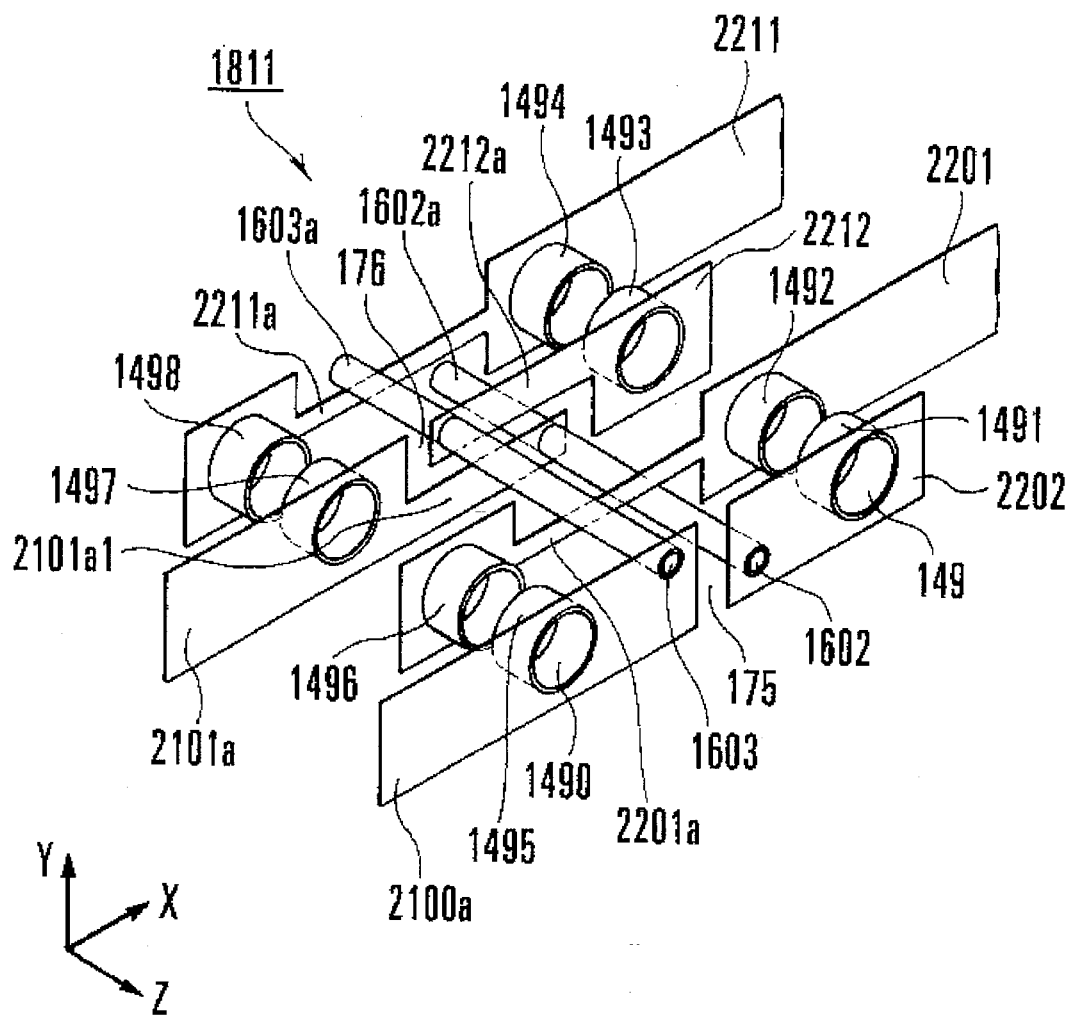
FIG. 25 is a perspective view showing a modification of the embodiment shown in FIG. 24.

FIG. 25 shows another arrangement of the patterns and crosspoint holes of the pin-board type polarity reversing circuit shown in FIGS. 23 and 24. Referring FIGS. 25, reference numeral 1811 denotes a pin-board type polarity reversing circuit (no connecting pin is shown) having another arrangement as a whole; 2100a and 2202, first patterns formed on the first layer; 2201, an X-direction pattern formed on the second layer; 2101a and 2212, second patterns formed on the third layer; 2211, an X-direction pattern formed on the fourth layer; 1602 and 1603, via holes; and 1602a and 1603a, conductors formed in the via holes 1602 and 1603. The conductor 1602a connects the patterns 2202 and 2101a to each other. The conductor 1603a connects the patterns 2100a and 2212a to each other. Reference numerals 175 and 176 denote cut portions; 149 and 1490, crosspoint holes respectively extending through the patterns 2100a and 2202 and the underlying patterns; 1495, 1496, 1497, and 1498, contacts formed in the crosspoint hole 1490; and 1491, 1492, 1493, and 1494, contacts formed in the crosspoint hole 149.

The structures of these cut portions 175 and 176 will be described in more detail below. The patterns 2202 and 2100a are cut from each other along the direction perpendicular to the wiring direction, i.e., the Y direction, and a gap, i.e., the cut portion 175, is ensured between the patterns 2202 and 2100a to space them apart from each other by a certain distance. In contrast to this, portions 2212a and 2101a1 protrude from ends of patterns 2212 and 2101a. The width of each protruding portion is almost ½ the width of each pattern. A crank-like gap, i.e., the cut portion 176, is ensured between the protruding portions to space them apart from each other. As a result, the protruding portion 2212a of the pattern 2212 is located below the pattern 2100a, and the protruding portion 2101a1 of the pattern 2101a is located below the pattern 2202.

The small-diameter via holes 1602 and 1603 are formed in the distal ends of the protruding portions 2212a and 2101a1 of the patterns 2212 and 2101a. The via holes 1602 and 1603 are connected to the conductors 1602a and 1603a which extend through the insulating substrate sandwiched between the patterns to perform interlayer connection. The patterns 2202 and 2101a, and the patterns 2100a and 2212 are electrically connected to each other via the via holes 1602 and 1603 and the conductors 1602a and 1603a, respectively. In this case, in order to prevent the patterns 2201 and 2211 from overlapping the through holes 1602 and 1603 and the conductors 1602a and 1603a, the corresponding portions of the patterns are formed into the portions 2201a and 2211a narrower than the remaining portions.

In the pin-board type polarity reversing circuit 1811 having the above arrangement, the contact 1491 in the crosspoint hole 149 is electrically connected to the contact 1497 in the crosspoint hole 1490 via the via hole 1602, and the contact 1495 in the crosspoint hole 1490 is electrically connected to the contact 1493 in the crosspoint hole 149 via the via hole 1603. Therefore, similar to the above embodiment, the polarity of an output from the pin-board matrix switch having the pin-board type polarity reversing circuits can be kept constant by selectively inserting the connecting pin 1511 into the crosspoint hole 149 or 1490. As is apparent, this pin-board type polarity reversing circuit has the same advantages as those of the pin-board type polarity reversing circuit shown in FIG. 24.

In the embodiments shown in FIGS. 16 to 25, the shapes of the patterns and the positions of the small-diameter through holes are examples and may be variously changed as long as separation structures, twist structures, and polarity reversing can be realized. As is apparent, with regard to layer arrangement, the order of combinations of pattern layers of the first and third layers and the pattern layers of the second and fourth layers can be changed. Furthermore, a matrix board with a higher density can be realized by using landless via holes or interstitial via holes (IVH) which extend through only insulating substrate portions sandwiched between required pattern layers to achieve electrical conduction.

Figure 26:
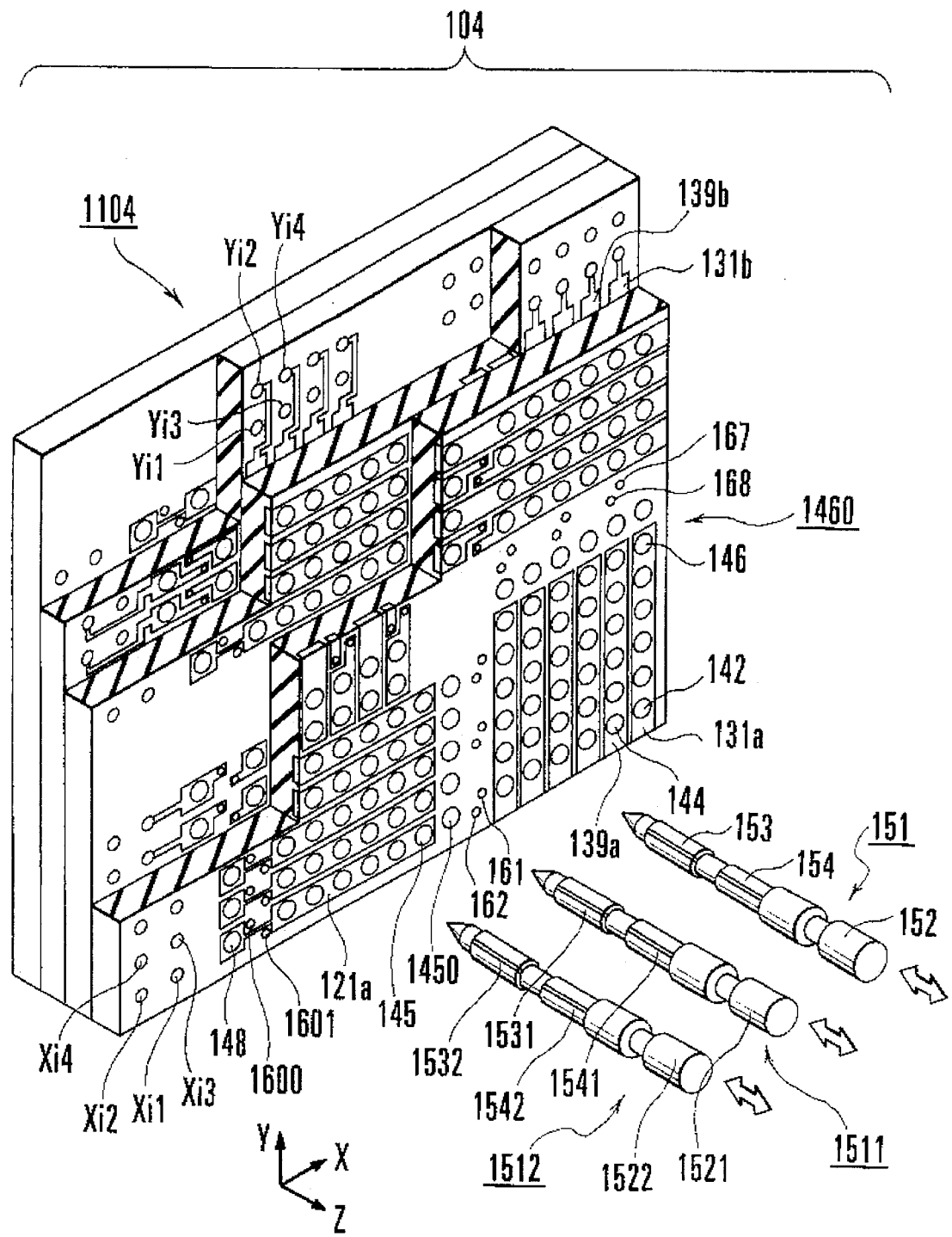
FIG. 26 is a partially cutaway perspective view of still another embodiment of the present invention, which is obtained by adding input/output ports to the embodiment shown in FIG. 23.

FIG. 26 shows an arrangement obtained by adding input/output ports to the embodiment shown in FIG. 23. Referring to FIG. 26, reference symbols Xi1, Xi2, Xi3, and Xi4 denote the input/output ports of X-direction patterns; and Yi1, Yi2, Yi3, and Yi4, the input/output ports of Y-direction patterns.

Figure 27:
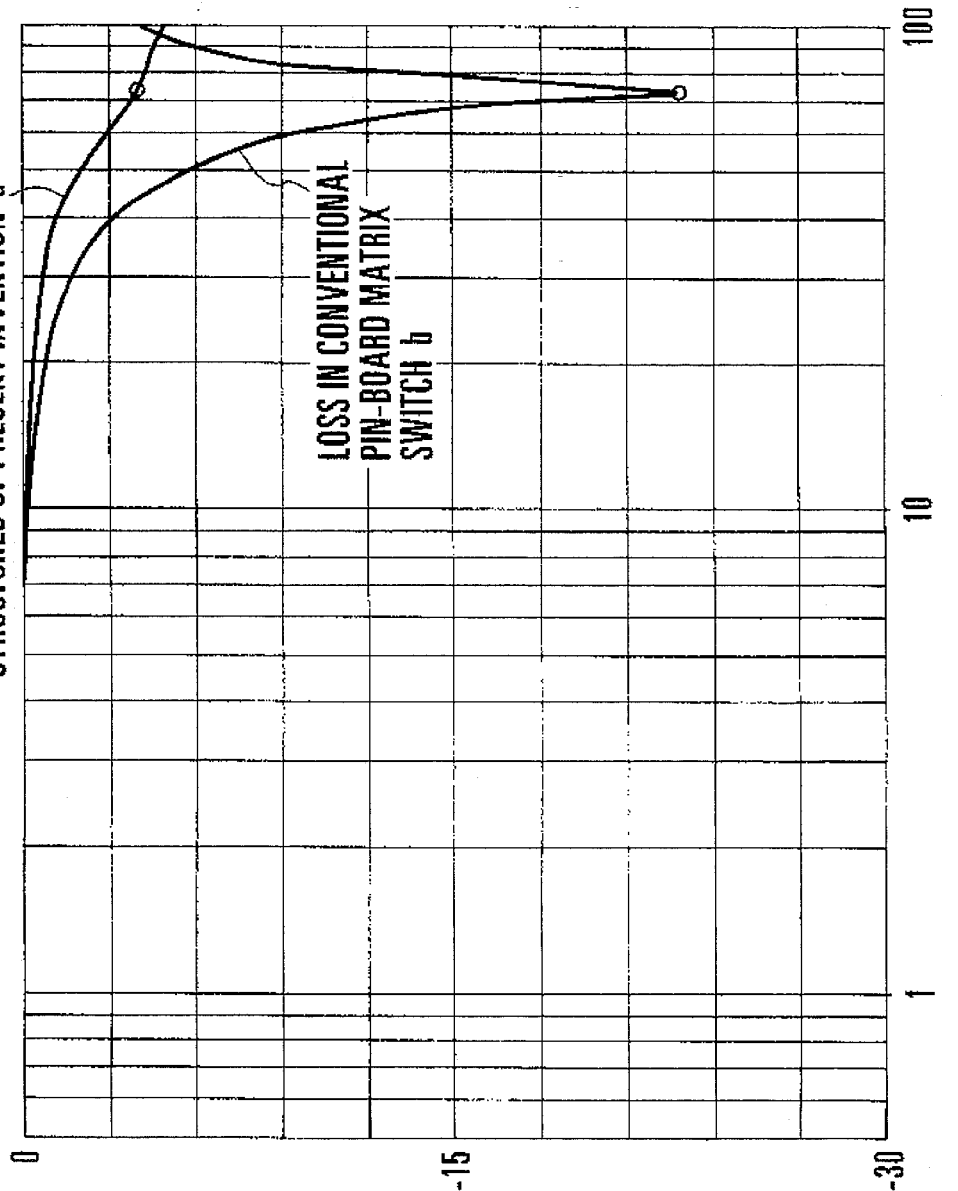
FIG. 27 is a graph showing the loss/frequency characteristics of a pin-board matrix switch having separation structures according to the embodiment shown in FIG. 26, in comparison with the conventional pin-board matrix switch.

FIG. 27 shows a measurement example of the loss/frequency characteristics of a pin-board matrix switch in comparison with the loss/frequency characteristics of a conventional pin-board matrix switch. Characteristic curves a and b represent the loss/frequency characteristics of the present invention and the prior art. The components constituting the matrix arrangements of the pin-board matrix switches of the present invention and the prior art have the same dimensions in practice. The matrix size is 280 mm×180 mm. The pitch of the patterns is 1.5 mm, and the width of each pattern is 1.2 mm. The twist structures of the present invention and the arrangement of separation structures comply with those shown in FIG. 24. Furthermore, the separation structure of the present invention is arranged almost in the middle of a pattern in each of the X and Y directions.

It is apparent from these characteristics that the conventional matrix switch exhibits anti-resonance type loss characteristics owing to the influence of an open line. That is, the loss increases to about −23 dB at about 70 MHz. In contrast to this, in the pin-board matrix switch having the separation structures, since the open line length is decreased to about ½ that of the conventional matrix switch by using the separation structures, the loss tends to gradually increase as the frequency increases to 100 MHz. Even the maximum loss is as low as about −5 dB.

Figure 28:
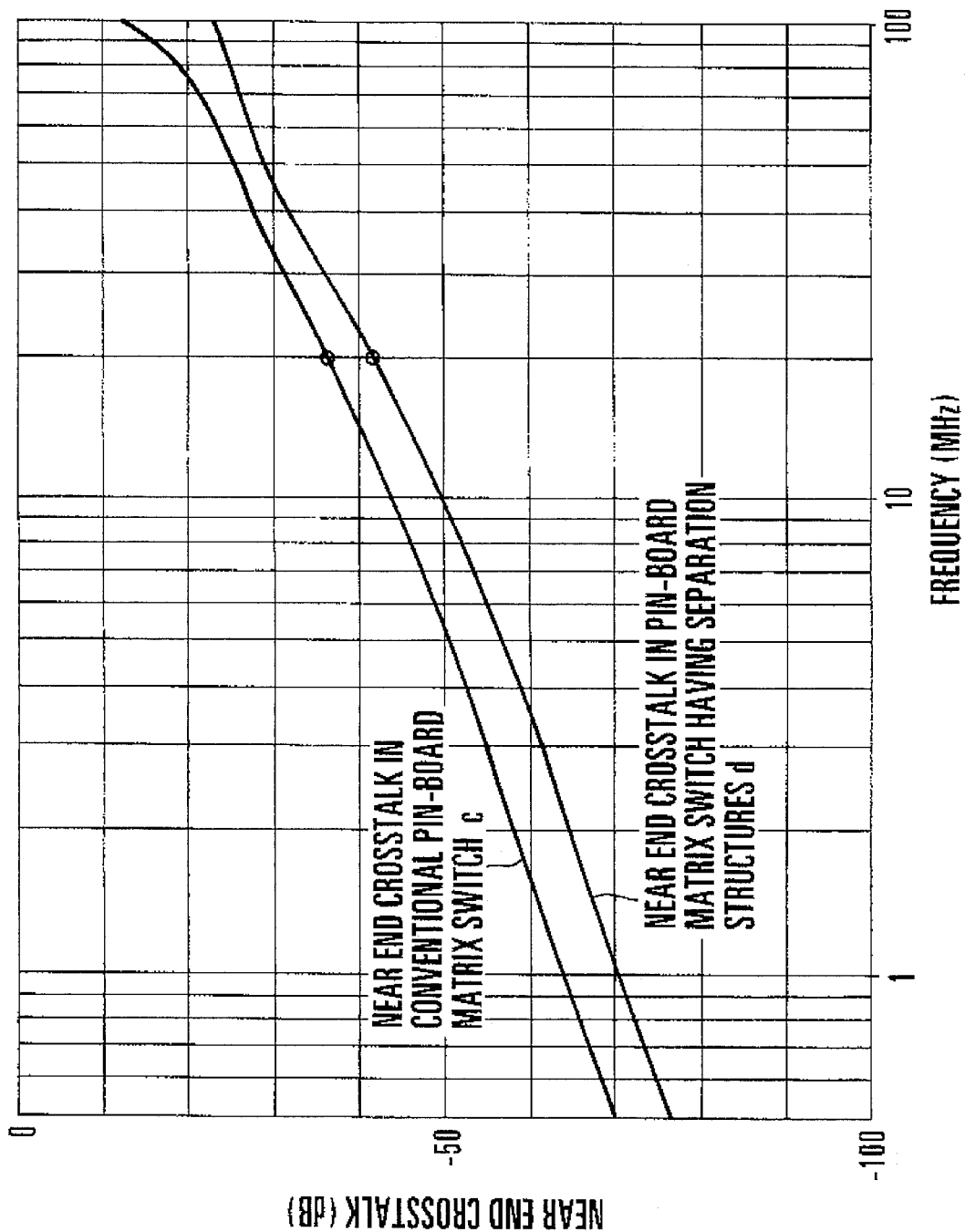
FIG. 28 is a graph showing the near end crosstalk/frequency characteristics of the pin-board matrix switch having the separation structures according to the embodiment shown in FIG. 26, in comparison with the conventional pin-board matrix switch.

FIG. 28 shows a measurement example of the near end crosstalk/frequency characteristics of a pin-board matrix switch having separation structures according to the present invention in comparison with the near end crosstalk/frequency characteristics of a conventional pin-board matrix switch. Characteristic curves c and d respectively indicate the characteristics of the prior art and the present invention. Various factors and elements and set routes comply with those in loss measurement in FIG. 27. In the pin-board matrix switch having separation structures of the present invention, since the coupling length in an open route is reduced to about ½ by using separation structures, the near end crosstalk can be reduced by about 5 dB as compared with the conventional pin-board matrix switch throughout the measurement frequency range.

Figure 29:
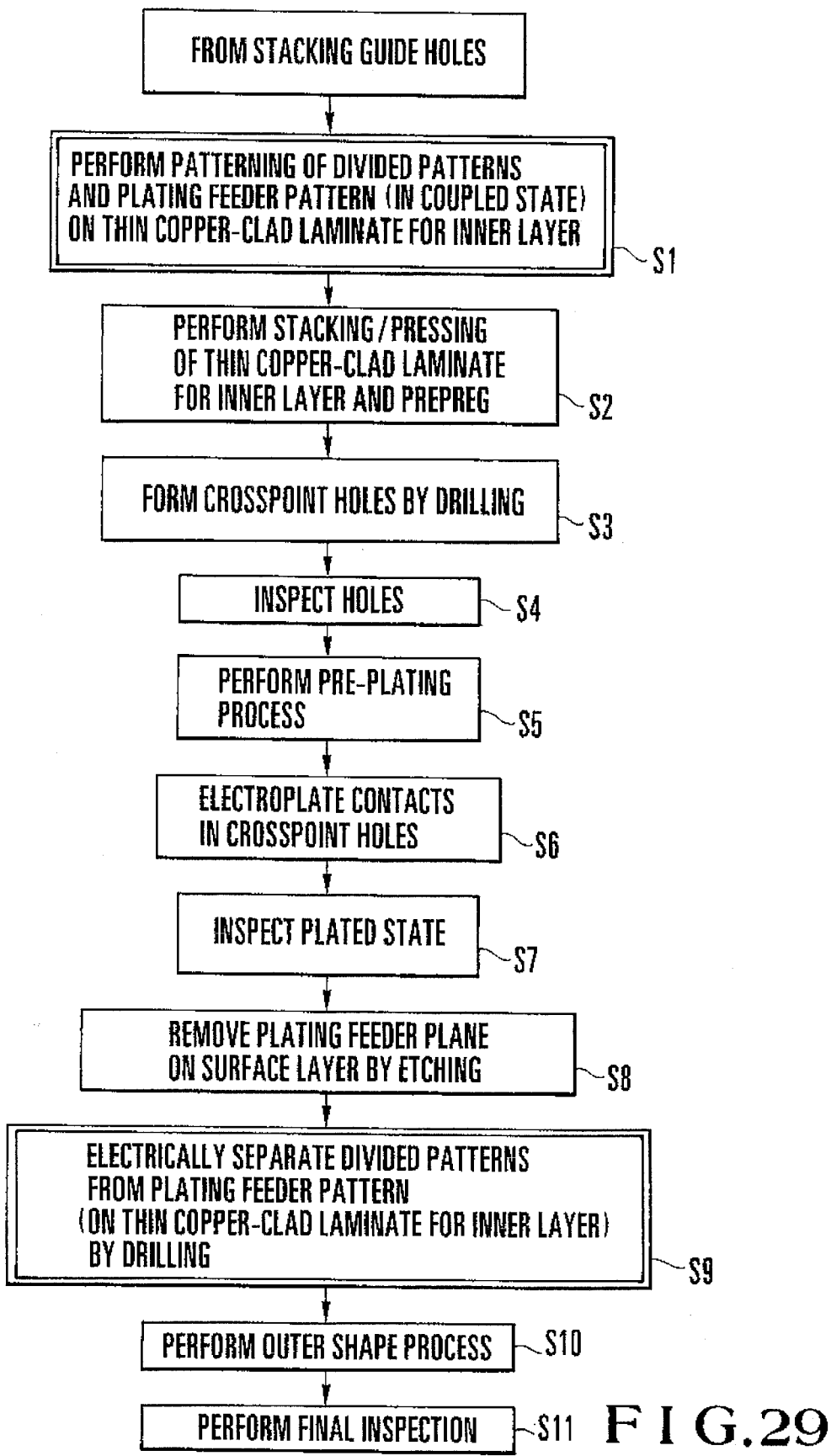
FIG. 29 is a flow chart showing a method of manufacturing a pin-board matrix switch according to an embodiment of the present invention.

FIGS. 29, 30A, 30B, 30C, and 30D show a method of manufacturing a pin-board matrix switch having separation structures according to the present invention. FIG. 29 shows a manufacturing process. On the uppermost layer, conductor patterns are placed using a plating feeder. Holes are drilled for making conductive contacts in the upper pattern, which in turn define crosspoint holes. FIGS. 30A, 30B, 30C, and 30D show the positional relationships between patterns and the arrangements of crosspoint holes, a plating feeder pattern, and separation holes of the uppermost layer of a separation structure, i.e., the surface layer of one thin copper-clad laminate, and a layer immediately thereunder, i.e., the lower surface layer of one thin copper-clad laminate when viewed from the upper surface of the thin copper-clad laminate. FIG. 31 shows the overall arrangement of a pin-board matrix switch formed by the method of the present invention. Referring to FIG. 29, portions associated with manufacturing steps considered as characteristic features of the present invention are indicated by double frames.

Figure 30A:
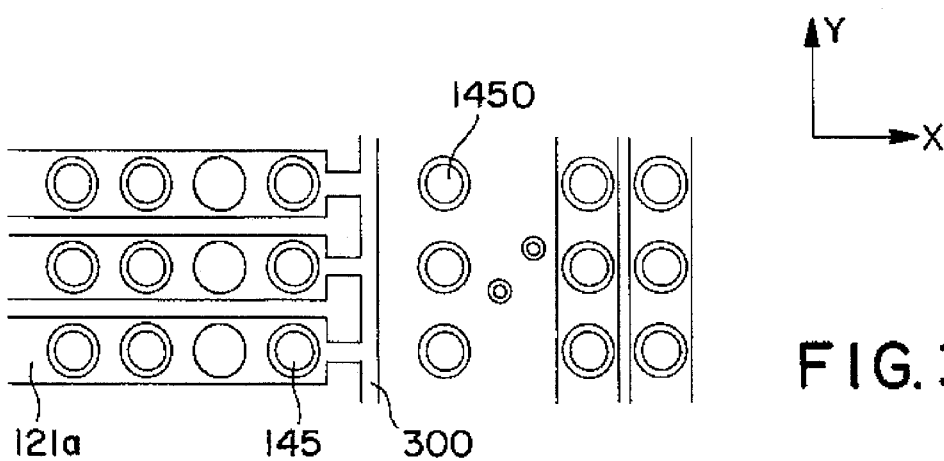
FIGS. 30A, 30B, 30C, and 30D are plan views showing manufacturing steps in the method in FIG. 29 in detail, and specifically the arrangement of the uppermost layer on which patterns having a plating feeder pattern are formed and in which separation holes and crosspoint holes are formed, and the arrangement of the wiring layer immediately under the uppermost layer.
Figure 31:
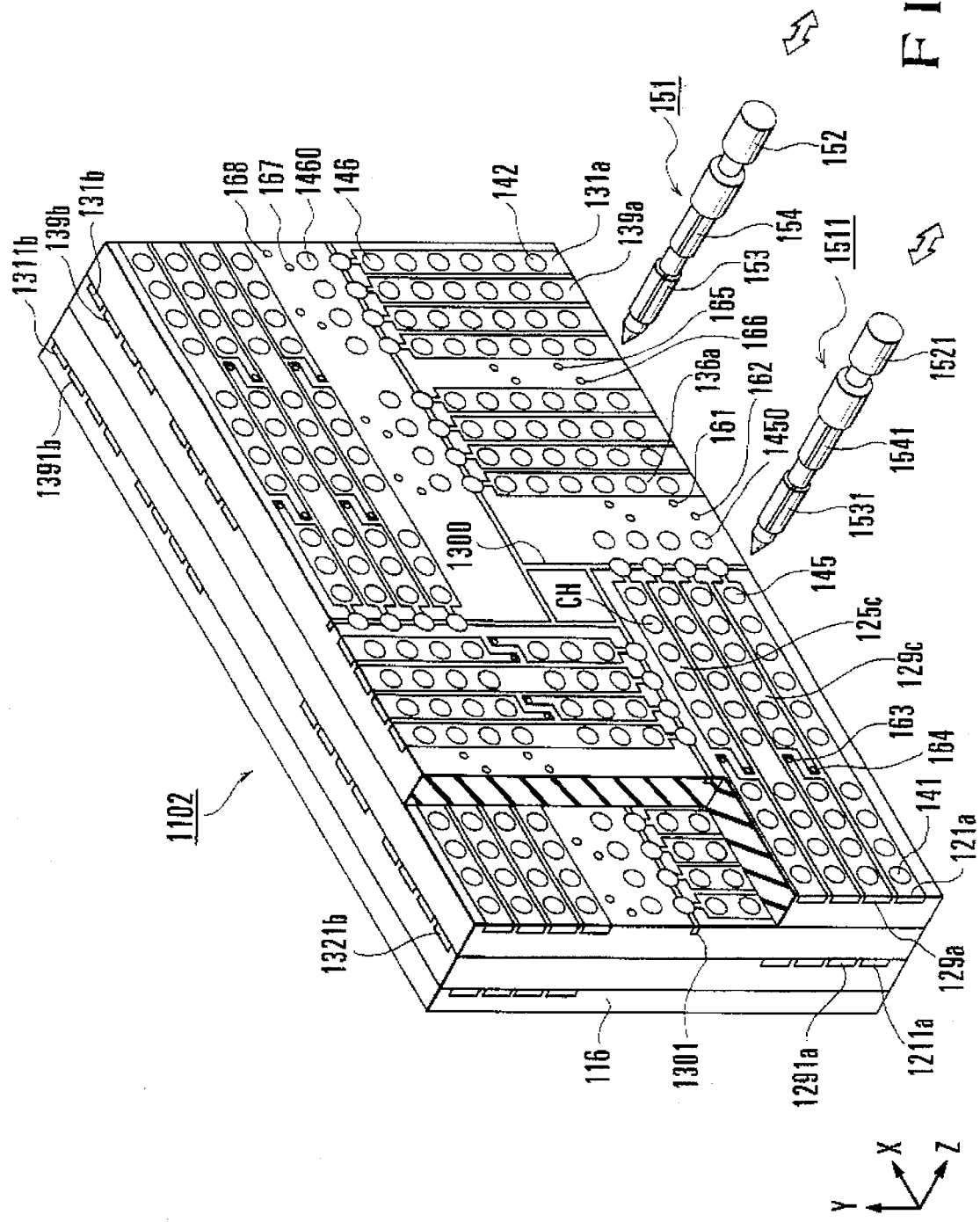
FIG. 31 is a partially cutaway perspective view showing a pin-board matrix switch manufactured by the manufacturing method shown in FIG. 29.
Figure 32:
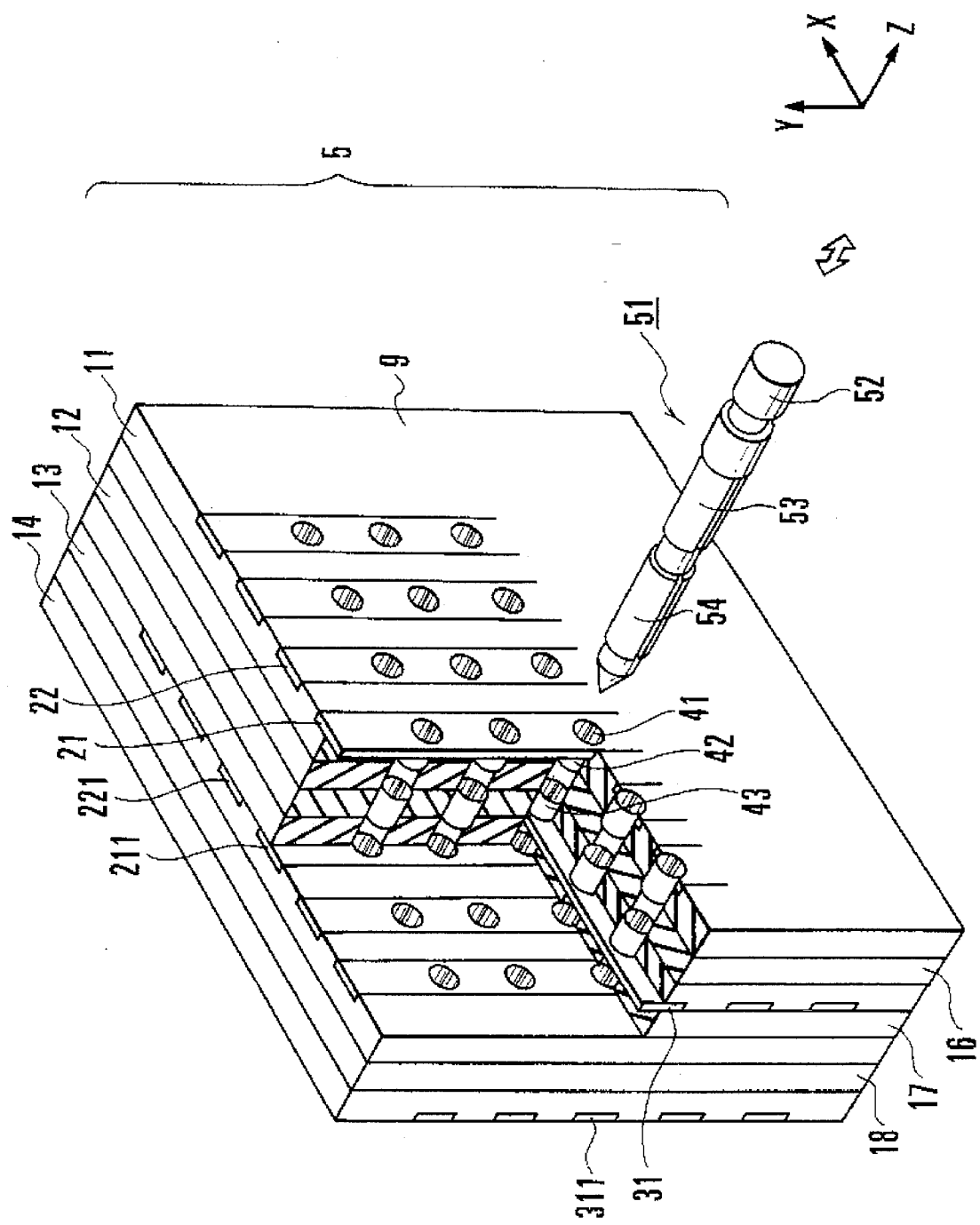
FIG. 32 is a perspective view showing the main portion of a conventional pin-board matrix switch.

In step S1 in FIG. 29, i.e., at an early stage in the matrix board manufacturing process, as shown in FIG. 30A, divided patterns 121a, ... on a thin copper-clad laminate are formed such that their end portions are coupled to a common plating feeder pattern 300. In step S2, this thin copper-clad laminate and a plurality of prepreg plates consisting of a fusible polymer resin are stacked on each other and pressed. In step S3, a crosspoint hole 145 and the like are formed by drilling. In step S4, the holes are inspected.

In step S5, the above member serving as a matrix board is cleaned by, e.g., acid cleaning and alkaline degreasing, thus performing a pre-plating process. In step S6, a plating current is supplied from a feeder plane (not shown) connected to the feeder pattern 300 and the other end of each of the divided patterns 121a, 121c, ... to electroplate contacts in the crosspoint hole 145 and the like in the electroplating process. In step S7, the plated state is inspected. In step S8, a plating feeder plate on the matrix board surface is removed by a normal chemical etching process.

Figure 30B:
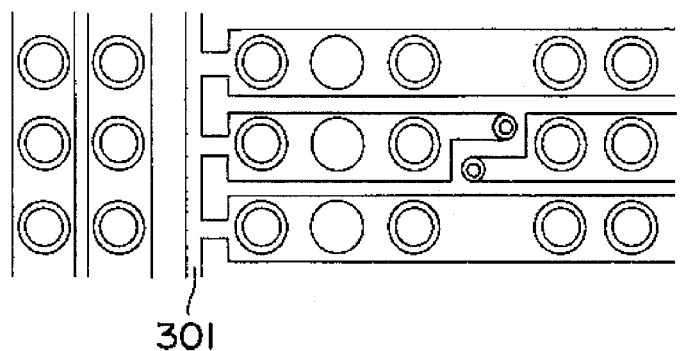
Figure 30C:
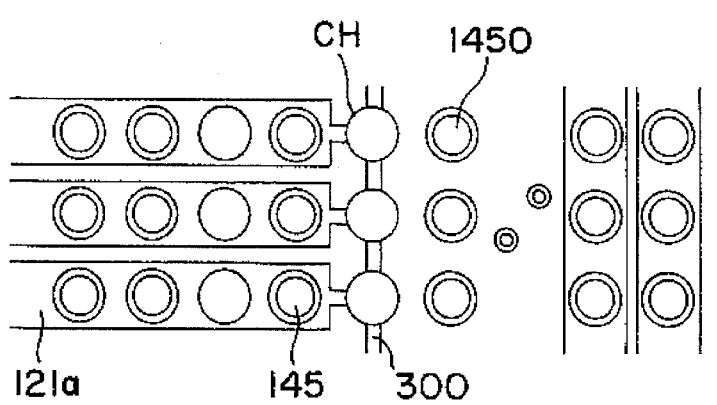
Figure 30D:
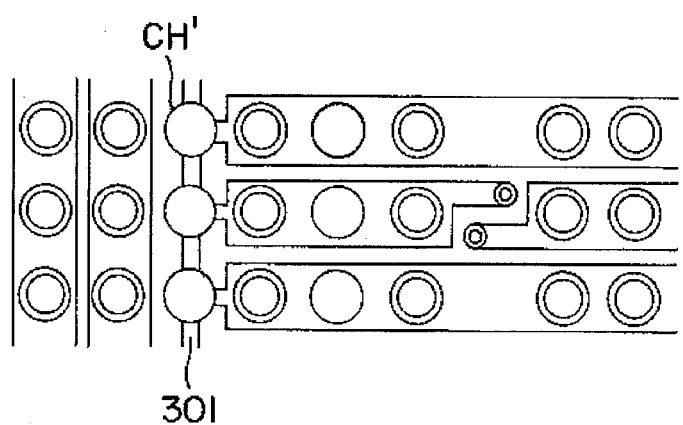

In this state, the divided patterns 121a, 129c, ... are short-circuited to the common feeder pattern 300. Therefore, in step S9, the divided patterns 121a, 129c, ... are mechanically separated by holes CH from the plating feeder pattern 300 by drilling with reference to stacking guide holes (not shown) formed at an initial stage in the matrix board manufacturing process. With this operation, a matrix board functioning as a matrix switch can be realized. After an outer shape is processed in step S10, a final inspection in step 11 is performed to complete the process. Referring to FIG. 30B, reference numeral 301 denotes a feeder pattern. Reference symbol CH' denotes a hole formed by drilling to mechanically separate each pattern.

When the divided patterns 121a, 129c, ... and the common plating feeder pattern 300 are formed in the above manner, a plating current can be supplied to contact portions in the crosspoint hole 145 and the like via the two ends of each of divided patterns 121a, 129c, ... to electroplate the contact portions. For this reason, contacts in many crosspoint holes formed in the divided pattern 121a, 129c, ... can be uniformly plated. In addition, even when separation structures are arranged at a plurality of portions, a plating current can be supplied to divided patterns which are isolated at middle portions. Consequently, contacts in crosspoint holes in the divided patterns isolated at the middle portions can also be plated. Furthermore, in separating the divided patterns from the plating feeder pattern, machining can be performed with reference to the stacking guide holes by using the same apparatus as that used to form the crosspoint holes. Therefore, no problems are posed in terms of positional precision. In addition, no new equipment for a separation process is required, resulting in an economical advantage.

As has been described above, according to the embodiments shown in FIGS. 16 to 31, one or both of X- and Y-direction patterns are divided via one or a plurality of cut portions substantially perpendicular to the signal transmission direction. The divided patterns are arranged to oppose each other such that they are adjacent to each other in the Z direction before and after the cut portion, and their end portions overlap in the Z direction. Crosspoint holes are formed in the overlapping portions of the divided patterns. Each crosspoint hole incorporates contacts which are electrically connected to the divided patterns and are electrically independent of each other. In this manner, a separation structure for removing a connecting pin from a crosspoint hole in accordance with a set route is formed. With such a separation structure, an open route other than a signal transmission route can be minimized. Therefore, characteristic impedance variations due to an open route and crosstalk in the open route can be suppressed, and a faster signal line can be accommodated as compared with a conventional pin-board matrix switch. In addition, since a separation structure can be integrally formed at the same time when a matrix board is manufactured, and no other components are required, the structure is very economical. Furthermore, since identical connecting pins can be used for the matrix board and each separation structure, a connecting pin inserting/removing mechanism and a connecting pin inserting/removing mechanism control system can be commonly used, resulting in a reduction in the size and cost of the overall apparatus. Moreover, in a separation structure, since the contact force of each contact spring of a connecting pin can be increased, high connection reliability can be maintained for a long period of time after a route setting operation.

According to the embodiments shown in FIGS. 16 to 31, crosstalk in a set signal transmission route can be canceled out before and after a twist structure, and crosstalk in a residual portion of the open route which cannot be completely separated can also be canceled out. Therefore, crosstalk in the pin-board matrix switch can be further reduced.

According to the above embodiments, with the polarity reversing circuits, the polarity of an output from the pin-board matrix switch having the polarity reversing circuits can be kept constant regardless of a route set in the pin-board matrix switch.

According to the above embodiments, the pin-board matrix switch having the pin-board type polarity reversing circuits can be reduced in volume and cost by forming the pin-board type polarity reversing circuits integrally with the matrix board. In addition, since the connecting pin for the pin-board matrix switch having the bin-board type polarity reversing circuits can be used for each pin-board type polarity reversing circuit without any modification, the connecting pin inserting/removing mechanism and the connecting pin inserting/removing mechanism control system can be commonly used for the pin-board matrix switch and each pin-board type polarity reversing circuit. Therefore, the pin-board matrix switch can be further reduced in size and cost. Furthermore, since the contact force of each contact spring of the connecting pin can be increased, high connection reliability can be maintained for a long period of time after a polarity setting operation.

According to the above embodiments, since a plating current can be supplied via the two ends of each divided pattern, contacts in many crosspoint holes distributed and formed in the divided patterns can be uniformly plated. In addition, even if separation structures are arranged at a plurality of portions, the contacts in the crosspoint holes can be plated.

Finally, according to each embodiment described above, contacts are formed in each crosspoint hole to allow the contact springs of a connecting pin to be connected to the contacts.

What is claimed is:

1. A pin-board matrix switch comprising:

a matrix board of X- directed and Y- directed conductor patterns arranged in matrix form with cylindrical contacts connected to the X- and Y- conductor patterns at crossing points thereof, and intermediate isolation portions for interrupting conduction between the X- and Y- conductor patterns, the conductor patterns stacked on top of one another in a Z-direction with the X- and Y- conductor patterns alternating, and the cylindrical contacts and the intermediate isolation portions defining crosspoint holes in the matrix board;

at least one twisted conductor pair comprising a lower and an upper conductor pattern in the same direction, each conductor pattern having a cut portion defining first and second divided wiring portions, longitudinal conductors connecting the first divided wiring portion in the upper conductor to the second divided wiring portion in the lower conductor and the second divided wiring portion in the upper conductor to the first divided wiring portion in the lower conductor; and a connecting pin comprising conductive springs, the connecting pin being selectively inserted into one of the crosspoint holes to electrically connect the X- and Y- conductor patterns.

2. A switch according to claim 1, wherein the twisted conductor pair is connected to a polarity reversing circuit.

3. A switch according to claim 2, wherein the polarity reversing circuit comprises:

a section of matrix board having four conductive patterns in the same direction defining a first and third (1-3) pattern pair and a second and fourth (2-4) pattern pair, cylindrical contacts connected to the patterns forming two through holes in the matrix board, the 1-3 pattern pair having cut portions forming a first and second part in each of the first and third patterns, longitudinal conductors connecting the first part in the first pattern to the second part in the third pattern and the second part in the first pattern to the first part in the third pattern, and wherein one of the 1-3 and 2-4 pattern pair is an input/output (I/O) terminal; and a connecting pin having conductive contacts, the pin being selectively inserted into one of the through holes to form a route for connecting the I/O terminal.

4. A switch according to claim 3, wherein the cut portion of the first pattern is formed in a direction perpendicular to a signal transmission direction, the cut portion of the second pattern is formed in the shape of a crank, and said respective conductor portions are through hole vias.

5. A switch according to claim 1, wherein one of the cut portions is formed in a direction perpendicular to a signal transmission direction, the other cut portion in the shape of a crank, and the respective conductor portions are through hole vias.

6. A switch according to claim 1, wherein the divided wiring portions adjoining the cut portions are different in shape from the more distant portions of the conductor patterns.

7. A switch according to claim 1, wherein at least one lower and upper conductor pattern have a connect/disconnect circuit midway along the conductor patterns, the connect/disconnect circuit including four conductor patterns stacked in the Z direction and a connecting pin having two contact springs, the four conductor patterns defining two pairs of patterns, the conductor patterns constituting each pair have end portions aligned in the Z direction, contacts connected to the end portions of the conductor patterns and forming a first through hole, and the conductor patterns constituting a pair are connected to each other when the connecting pin is inserted into the first through hole.

8. A switch according to claim 7, wherein the twisted conductor pair is connected to a polarity reversing circuit.

9. A switch according to claim 8, wherein the polarity switching circuit comprises four conductor patterns with cylindrical contacts stacked in the Z direction such that the cylindrical contacts form a first and second through hole, and a connecting pin having two contact springs, the four conductor patterns of the polarity switching circuit defining two pairs of conductor patterns, each pair having a lower and upper conductor pattern, one of the pairs being connected to one input/output (I/O) terminal, a first pair comprising first and second cut portions, formed at corresponding positions of upper and slower conductors in the first pair for dividing each pattern into two divided wiring portions, and conductor portions for connecting the first divided wiring portion of the upper conductor pattern of the first pair to the second divided wiring portion of the lower conductor pattern of the first pair and the second divided wiring portion of the upper conductor pattern to the first divided wiring portion of the lower conductor pattern, wherein the connecting pin is selectively inserted into one of the first and second through holes to form a route for connecting the I/O terminal.

10. A switch according to claim 9, wherein the first cut portion of the first pair is formed in a direction perpendicular to a signal transmission direction, the second cut portion of the first pair is shaped in the form of a crank, and the conductor portions connecting the divided wiring portions are through hole vias.

11. A switch according to claim 7, further comprising a dummy through hole, formed on an extended line of the upper conductor pattern of the first pair and separated from an end portion of the upper conductor pattern, for holding the connecting pin.

12. A switch according to claim 1, wherein the longitudinal conductors in the twisted conductor pair of adjacent conductor patterns are located in different positions.

13. A pin-board matrix switch comprising:

a plurality of X-direction patterns arranged in an X-direction;

Y-direction patterns arranged in a Y direction to constitute a matrix together with said X-direction patterns, the matrix defining X-direction pattern pairs and Y-direction pattern pairs;

contacts connected to said patterns and forming crosspoint holes at crosspoints between said X- and Y-direction patterns;

a connecting pin having contact springs, said connecting pin being selectively inserted into the cross point holes to electrically connect contacts of said X-direction patterns and said Y-direction patterns which are adjacent to each other in a Z direction; and insulating members arranged between said X- and Y-direction patterns;

wherein at least one of said pattern pairs includes a wiring connecting portion for disconnecting/connecting the patterns midway along a wiring route, said wiring connecting portion includes four layered patterns defining two wiring pairs having end portions, cylindrical contacts connected to the end portions, the wiring pairs stacked on each other in the Z direction such that the end portions in each pair lie above one another and the contacts define a through hole, and a connecting pin having two contact springs, wherein said patterns of a pair are connected to each other when said connecting pin is inserted into the through hole.

* * * * *

UNITED STATES PATENT AND TRADEMARK OFFICE
CERTIFICATE OF CORRECTION

PATENT NO. : 5,544,004
DATED : August 6, 1996
INVENTOR(S) : Inagaki et al.

It is certified that error appears in the above-indentified patent and that said Letters Patent is hereby corrected as shown below:

In column 7 at line 46, please delete " j " and insert -- d --.

In column 13 at line 29, please delete -- AL -- and insert -- $\Delta$L --.

In column 13 at lines 50-54, please delete " In the case of an n-wire line or the like, a 2n-layer matrix board is used, and twist structures and polarity reversing circuits are sequentially provided between two arbitrary wires, thereby obtaining the same effects as those for a two-wire line. "

Signed and Sealed this

Twenty-eighth Day of October, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,544,004
DATED : August 6, 1996
INVENTOR(S) : Inagaki et al.

It is certified that error appears in the above-identified patent and that said Letters Patent is hereby corrected as shown below:

On the title page, item [56] References Cited, please insert --

| | | | |
|---|---|---|---|
| 2,777,024 | 1/1957 | West | |
| 3,227,831 | 1/1966 | Jacks et al. | 200/50.11 |
| 4,011,424 | 3/1997 | Frieson et al. | 200/308 --. |

Signed and Sealed this

Twentieth Day of October, 1998

Attest:

BRUCE LEHMAN

*Attesting Officer*     *Commissioner of Patents and Trademarks*